United States Patent
Yoo et al.

(10) Patent No.: US 9,723,496 B2
(45) Date of Patent: Aug. 1, 2017

(54) METHOD AND APPARATUS FOR INTERFERENCE CANCELLATION BY A USER EQUIPMENT USING BLIND DETECTION

(71) Applicant: QUALCOMM Incorporated, San Diego, CA (US)

(72) Inventors: Taesang Yoo, San Diego, CA (US); Hendrik Schoeneich, Heroldsberg (DE); Tao Luo, San Diego, CA (US); Yongbin Wei, San Diego, CA (US); Myriam Rajih, Nuremberg (DE); Durga Prasad Malladi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 279 days.

(21) Appl. No.: 14/105,086

(22) Filed: Dec. 12, 2013

(65) Prior Publication Data
US 2014/0098773 A1    Apr. 10, 2014

Related U.S. Application Data

(63) Continuation-in-part of application No. 13/464,905, filed on May 4, 2012, now abandoned.
(Continued)

(51) Int. Cl.
| | |
|---|---|
| *H04W 24/02* | (2009.01) |
| *H04L 5/00* | (2006.01) |
| *H04B 7/06* | (2006.01) |
| *H04B 7/08* | (2006.01) |
| *H04J 11/00* | (2006.01) |

(52) U.S. Cl.
CPC ............ *H04W 24/02* (2013.01); *H04B 7/068* (2013.01); *H04B 7/0678* (2013.01);
(Continued)

(58) Field of Classification Search
CPC .... H04B 7/0678; H04B 7/068; H04B 7/0842; H04B 17/345; H04B 7/063; H04B 7/0639;
(Continued)

(56) References Cited

U.S. PATENT DOCUMENTS

| | | | |
|---|---|---|---|
| 6,130,886 | A | 10/2000 | Ketseoglou et al. |
| 7,151,755 | B2 | 12/2006 | Xu |

(Continued)

FOREIGN PATENT DOCUMENTS

| | | |
|---|---|---|
| CN | 1706141 A | 12/2005 |
| EP | 1274208 A1 | 1/2003 |

(Continued)

OTHER PUBLICATIONS

Yano et al., "Wireless Communication Method, Wireless Communication System and Wireless Communication Apparatus", Oct. 6, 2011, WO, WO2011121774, machine translation.*
(Continued)

*Primary Examiner* — Paul H Masur
*Assistant Examiner* — Michael Phillips
(74) *Attorney, Agent, or Firm* — Nerrie M. Zohn

(57) ABSTRACT

In order to cancel any interference due to the second signal (e.g., from a non-serving cell) from a signal received at a UE, without receiving additional control information, the UE blindly estimates parameters associated with decoding the second signal. This may include determining a metric based on sets of symbols associated with the signals in order to determine parameters for the second signal, e.g., the transmission mode, modulation format, and/or spatial scheme of the second signal. The parameters for the signal may be determined based on a comparison of the metric with a threshold. When a spatial scheme and a modulation format is unknown, the blind estimation may include determining a
(Continued)

plurality of constellations of possible transmitted modulated symbols associated with a potential spatial scheme and modulation format combination. Interference cancellation can be performed using the constellations and a corresponding probability weight.

28 Claims, 24 Drawing Sheets

Related U.S. Application Data

(60) Provisional application No. 61/556,115, filed on Nov. 4, 2011, provisional application No. 61/556,217, filed on Nov. 5, 2011, provisional application No. 61/557,332, filed on Nov. 8, 2011.

(52) U.S. Cl.
CPC .......... *H04B 7/0842* (2013.01); *H04J 11/005* (2013.01); *H04L 5/0058* (2013.01)

(58) Field of Classification Search
CPC ...... H04B 15/00; H04B 1/7103; H04B 1/711; H04B 1/7107; H04B 7/0854; H04L 5/0058; H04L 5/0048; H04L 5/00; H04L 1/00; H04L 25/0238; H04L 27/0012; H04L 1/0038; H04J 11/005; H04J 11/0023; H04W 24/02; H04W 72/082; H04W 28/04; H04W 28/048; H04W 48/16

See application file for complete search history.

(56) References Cited

U.S. PATENT DOCUMENTS

| | | | |
|---|---|---|---|
| 7,826,516 B2 | 11/2010 | Guess et al. | |
| 8,270,602 B1 | 9/2012 | Forman et al. | |
| 9,112,552 B2* | 8/2015 | Ko | H04B 7/0413 |
| 2002/0009156 A1 | 1/2002 | Hottinen et al. | |
| 2002/0181549 A1* | 12/2002 | Linnartz | H04L 25/03038 |
| | | | 375/142 |
| 2003/0223398 A1* | 12/2003 | Haim | H04B 1/7105 |
| | | | 370/342 |
| 2005/0025099 A1 | 2/2005 | Heath et al. | |
| 2005/0175122 A1 | 8/2005 | Nefedov et al. | |
| 2005/0254600 A1 | 11/2005 | Chen et al. | |
| 2006/0067395 A1 | 3/2006 | Hafeez | |
| 2006/0072679 A1 | 4/2006 | Chen et al. | |
| 2007/0005749 A1 | 1/2007 | Sampath | |
| 2007/0060058 A1 | 3/2007 | Shattil | |
| 2007/0183544 A1 | 8/2007 | Lee et al. | |
| 2007/0253364 A1 | 11/2007 | Wandel | |
| 2008/0168326 A1* | 7/2008 | Hwang | H04B 7/0413 |
| | | | 714/758 |
| 2008/0232494 A1* | 9/2008 | Pan | H04B 7/0426 |
| | | | 375/260 |
| 2008/0260068 A1 | 10/2008 | Seyedi-Esfahani | |
| 2009/0041140 A1 | 2/2009 | Xiao et al. | |
| 2009/0052576 A1 | 2/2009 | Golitschek et al. | |
| 2009/0067521 A1* | 3/2009 | Bouzegzi | H04L 27/2662 |
| | | | 375/260 |
| 2009/0110033 A1* | 4/2009 | Shattil | H04B 1/7174 |
| | | | 375/141 |
| 2010/0080323 A1 | 4/2010 | Mueck et al. | |
| 2010/0111226 A1* | 5/2010 | Ko | H04B 7/0639 |
| | | | 375/299 |
| 2010/0118989 A1 | 5/2010 | Sayana et al. | |
| 2010/0190447 A1 | 7/2010 | Agrawal et al. | |
| 2010/0260231 A1* | 10/2010 | Ringstrom | H04B 1/7103 |
| | | | 375/130 |
| 2010/0272201 A1* | 10/2010 | Nakao | H04L 5/0023 |
| | | | 375/260 |
| 2010/0272220 A1 | 10/2010 | Murai et al. | |
| 2010/0309861 A1* | 12/2010 | Gorokhov | H04B 1/7103 |
| | | | 370/329 |
| 2010/0309876 A1 | 12/2010 | Khandekar et al. | |
| 2011/0019776 A1* | 1/2011 | Zhang | H04L 5/0023 |
| | | | 375/340 |
| 2011/0026645 A1 | 2/2011 | Luo et al. | |
| 2011/0044269 A1 | 2/2011 | Fan et al. | |
| 2011/0076991 A1 | 3/2011 | Mueck et al. | |
| 2011/0080923 A1 | 4/2011 | McCloud et al. | |
| 2011/0103498 A1 | 5/2011 | Chen et al. | |
| 2011/0103509 A1* | 5/2011 | Chen | H04L 5/0007 |
| | | | 375/295 |
| 2011/0129008 A1* | 6/2011 | Chmiel | H04J 11/0073 |
| | | | 375/224 |
| 2011/0149929 A1* | 6/2011 | Kleider | H04L 5/0023 |
| | | | 370/338 |
| 2011/0188587 A1* | 8/2011 | Zhang | H04L 5/0053 |
| | | | 375/260 |
| 2011/0200126 A1 | 8/2011 | Bontu et al. | |
| 2011/0205914 A1 | 8/2011 | Krishnamurthy et al. | |
| 2011/0249633 A1* | 10/2011 | Hong | H04L 5/0053 |
| | | | 370/329 |
| 2011/0255623 A1 | 10/2011 | Golitschek Edler Von Elbwart et al. | |
| 2011/0267937 A1 | 11/2011 | Yoo et al. | |
| 2011/0287792 A1 | 11/2011 | Zhang et al. | |
| 2011/0293026 A1* | 12/2011 | Bouzegzi | H04L 27/2676 |
| | | | 375/260 |
| 2011/0299489 A1* | 12/2011 | Kim | H04L 1/0046 |
| | | | 370/329 |
| 2012/0008511 A1 | 1/2012 | Fan et al. | |
| 2012/0026964 A1* | 2/2012 | Koivisto | H04B 7/0452 |
| | | | 370/329 |
| 2012/0051306 A1* | 3/2012 | Chung | H04L 1/1893 |
| | | | 370/329 |
| 2012/0113794 A1 | 5/2012 | Roman et al. | |
| 2012/0113961 A1 | 5/2012 | Krishnamurthy | |
| 2012/0176884 A1* | 7/2012 | Zhang | H04B 7/024 |
| | | | 370/203 |
| 2012/0219095 A1* | 8/2012 | Pitkanen | H04L 1/0038 |
| | | | 375/340 |
| 2012/0225625 A1 | 9/2012 | Asplund et al. | |
| 2012/0250551 A1* | 10/2012 | Sartori | H04W 48/12 |
| | | | 370/252 |
| 2012/0300728 A1* | 11/2012 | Lee | H04J 13/16 |
| | | | 370/329 |
| 2012/0307778 A1* | 12/2012 | Nishio | H04L 1/0047 |
| | | | 370/329 |
| 2013/0022005 A1* | 1/2013 | Yano | H04L 1/0046 |
| | | | 370/329 |
| 2013/0039284 A1* | 2/2013 | Marinier | H04L 5/001 |
| | | | 370/329 |
| 2013/0114437 A1 | 5/2013 | Yoo et al. | |
| 2013/0301467 A1* | 11/2013 | Kang | H04B 7/024 |
| | | | 370/252 |
| 2013/0329711 A1* | 12/2013 | Seo | H04J 11/0069 |
| | | | 370/336 |
| 2014/0112250 A1 | 4/2014 | Bahrenburg | |

FOREIGN PATENT DOCUMENTS

| | | |
|---|---|---|
| JP | 2002261851 A | 9/2002 |
| WO | 2004019622 A2 | 3/2004 |
| WO | 2010022075 A1 | 2/2010 |
| WO | 2010080920 A1 | 7/2010 |
| WO | 2011006744 A1 | 1/2011 |
| WO | 2011085399 A1 | 7/2011 |
| WO | 2011121774 | * 10/2011 |

OTHER PUBLICATIONS

France Telecom & Orange: "Inter-cell interference estimation for OFDMA and MC-CDMA on the DL", 3GPP Draft; R1-050405, 3rd Generation Partnership Project (3GPP), Mobile Competence Centre; 650, Route Des Lucioles; F-06921 Sophia-Antipolis Cedex;

(56) References Cited

OTHER PUBLICATIONS

France, vol. RAN WG1, No. Athens, Greece; 20050504, May 4, 2005, XP050100100, [retrieved on May 4, 2005].
France Telecom et al., "Interference cancellation for LTE & TP for TR25.814", 3GPP Draft; R1-060359, 3rd Generation Partnership Project (3GPP), Mobile Competence Centre; 650, Route Des Lucioles; F-06921 Sophia-Antipolis Cedex; France, vol. RAN WG1, No. Denver, USA, Feb. 7, 2006, XP050101306, [retrieved on Feb. 7, 2006].
Nortel: "The Reliability Improvement of the Blind Detection of the Antenna Configuration", 3GPP Draft; R1-080379 (Nortel-Blind Detections TX Antenna), 3rd Generation Partnership Project (3GPP), MOB1 LE Competence Centre ; 650, Route Des Lucioles ; F-06921 Sophia-Anti Polis Cedex ; France, vol. RAN WG1, No. Sevilla , Spain; Jan. 9, 2008, Jan. 9, 2008 (Jan. 9, 2008), XP050108898, [retrieved on Jan. 9, 2008].
Partial International Search Report—PCT/US2012/036839—ISA/EPO—Aug. 20, 2012.
Zhang , J ., Andrews , J. G. & Letaief , K. B. (May 2011) . Spatial Intercell Interference Cancellation with CSI Training and Feedback. pp. 1-24. Retrieved from wncg. org/publications/dl.php"file=Andrews1311620584 .pdf.
Office Action dated Aug. 11, 2015 from corresponding Korean Application No. 2014-7015113.
Office Action dated Jun. 30, 2015 from corresponding Japanese Application No. 2014-541034.
International Search Report and Written Opinion—PCT/US2012/036839—ISA/EPO—Nov. 6, 2012.
Translation of Office Action for Korean Patent Application No. 10-2014-7015113 dated Jun. 8, 2016, 8 pages.

\* cited by examiner

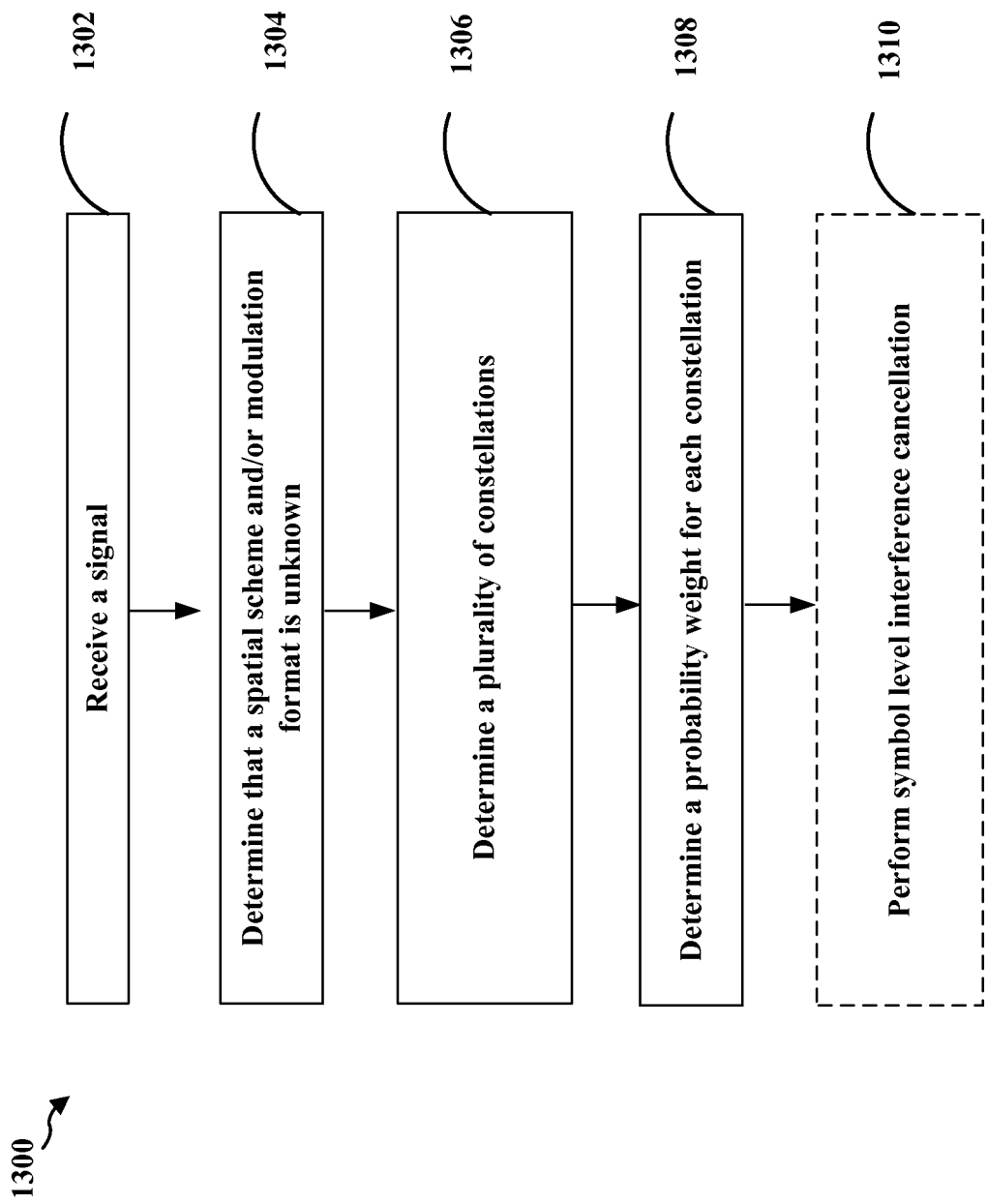

Extended constellation from each TX antenna with unknown spatial scheme

Symbol 1     $s_1 = \pm 1/\sqrt{2} \pm j*1/\sqrt{2}$

Symbol 2     $s_2 = \pm 1/\sqrt{2} \pm j*1/\sqrt{2}$

METHOD AND APPARATUS FOR INTERFERENCE CANCELLATION BY A USER EQUIPMENT USING BLIND DETECTION

CROSS-REFERENCE TO RELATED APPLICATIONS

The present application is a continuation-in-part of U.S. application Ser. No. 13/464,905, filed May 4, 2012, titled "Method and Apparatus for Interference Cancellation by a User Equipment Using Blind Detection," which claims the benefit of U.S. Provisional Application Ser. No. 61/556,115, entitled "Interference Cancellation Having Blind Detection" and filed on Nov. 4, 2011; U.S. Provisional Application Ser. No. 61/556,217, entitled "Method and Apparatus for Interference Cancellation by a User Equipment Involving Blind Spatial Scheme Detection" and filed on Nov. 5, 2011; and U.S. Provisional Application Ser. No. 61/557,332, entitled "Symbol Level Interference Cancellation with Unknown Transmission Scheme and/or Modulation Order" and filed on Nov. 8, 2011, each of which is expressly incorporated by reference herein in its entirety.

BACKGROUND

Field

The present disclosure relates generally to communication systems, and more particularly, to interference cancellation by a user equipment (UE) involving blind detection.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology.

A wireless communication network may include a number of base stations that can support communication for a number of UEs. A UE may communicate with a base station via the downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, there exists a need for further improvements in LTE technology. The possibility of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications. Preferably, these improvements should be applicable to other multi-access technologies and the telecommunication standards that employ these technologies.

SUMMARY

A UE may receive a signal that includes a signal from a first cell (e.g. a serving cell) and a second, non-serving cell. The signal may comprise a first set of symbols and a second set of symbols. In order to cancel any interference due to the second cell signal from the received signal without receiving additional control information, the UE blindly estimates parameters associated with decoding the second cell signal. Such parameters may include any of the transmission mode, modulation format, and spatial scheme for the second cell signal. This may include determining a metric based on the first set of symbols and the second set of symbols and comparing the metric with a threshold. The parameters for the signal may be determined based on the comparison.

The blind estimation of parameters associated with decoding the part of the signal due to the second cell signal may also include determining that a spatial scheme and a modulation format is unknown. Thereafter, a plurality of constellations can be determined, each constellation comprising a plurality of possible transmitted modulated symbols associated with a potential spatial scheme and modulation format combination. A probability weight can be determined for each constellation, and the combination of the plurality of constellations and their assigned probability weights can be used to perform interference cancellation.

In an aspect of the disclosure, a method, a computer program product, and an apparatus are provided. The apparatus receives a signal comprising a first cell signal from a first and a second cell signal from a second cell. The second cell signal may be a downlink shared channel or a control channel. The apparatus blindly estimates parameters (e.g. a transmission mode, a modulation format, and/or a spatial scheme) associated with decoding the second cell signal. The apparatus cancels interference from the received signal due to the second cell signal. The interference cancellation is based on the blindly estimated parameters.

In another aspect, a method, a computer program product, and an apparatus are provided in which the apparatus receives at least one signal. The signal comprises a first set of symbols and a second set of symbols. The apparatus blindly estimates parameters associated with the second set of symbols by determining a metric based on the first set of symbols and the second set of symbols, comparing the metric with a threshold, and determining a spatial scheme associated with the at least one signal based on the comparison.

In another aspect, a method, a computer program product, and an apparatus are provided in which the apparatus receives a signal and determines that at least one of a spatial scheme and a modulation format is unknown for the signal. Thereafter, the apparatus determines a plurality of constellations, each constellation comprising a plurality of possible transmitted modulated symbols associated with a potential spatial scheme and modulation format combination and a corresponding probability weight for each constellation. Then, the apparatus determines at least one of the spatial scheme and modulation format using the determined plurality of constellations and the determined probability weight for each constellation.

BRIEF DESCRIPTION OF THE DRAWINGS

FIG. 13 is a flow chart of an example method of wireless communication.

DETAILED DESCRIPTION

Figure 1:
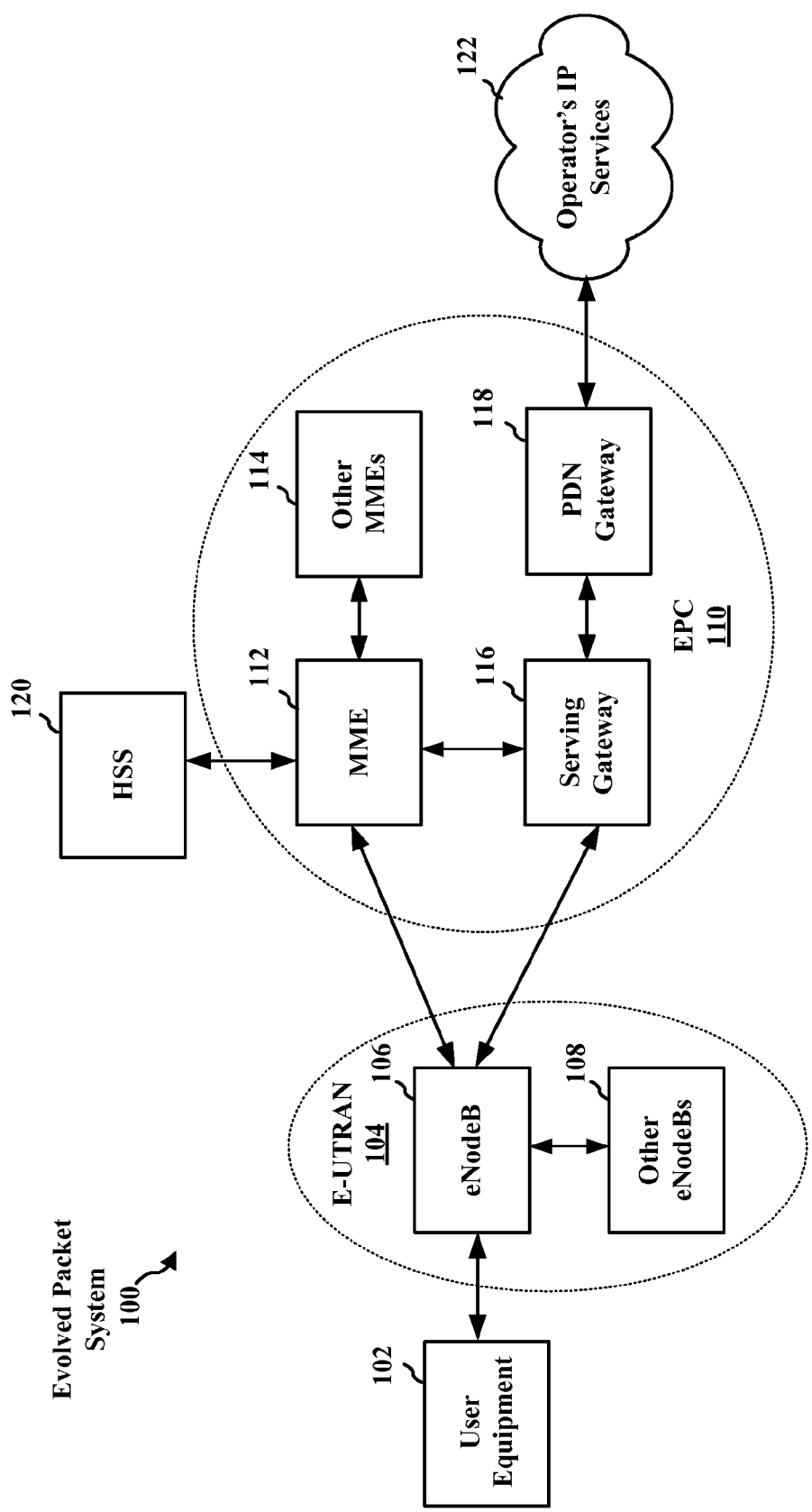
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
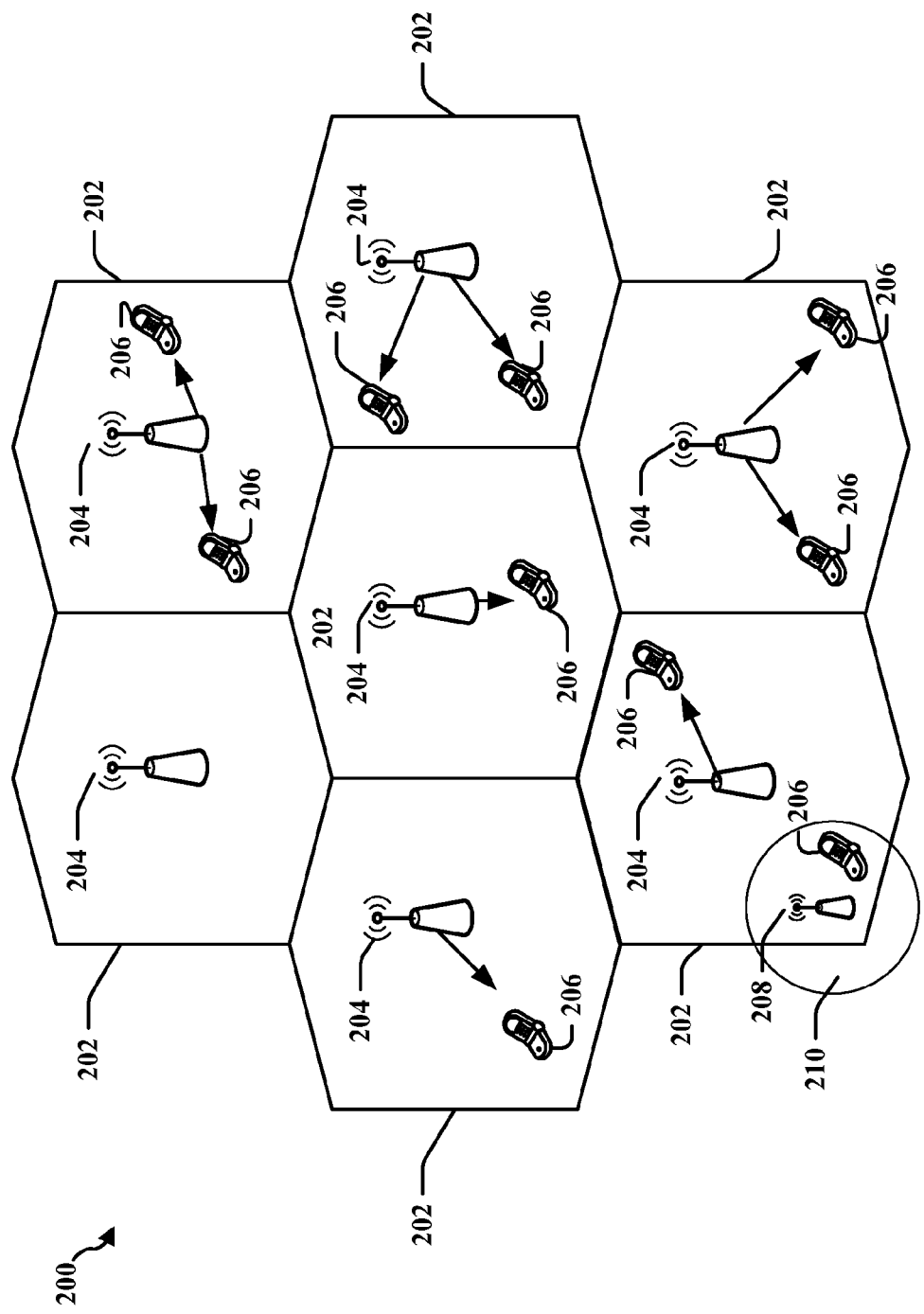
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
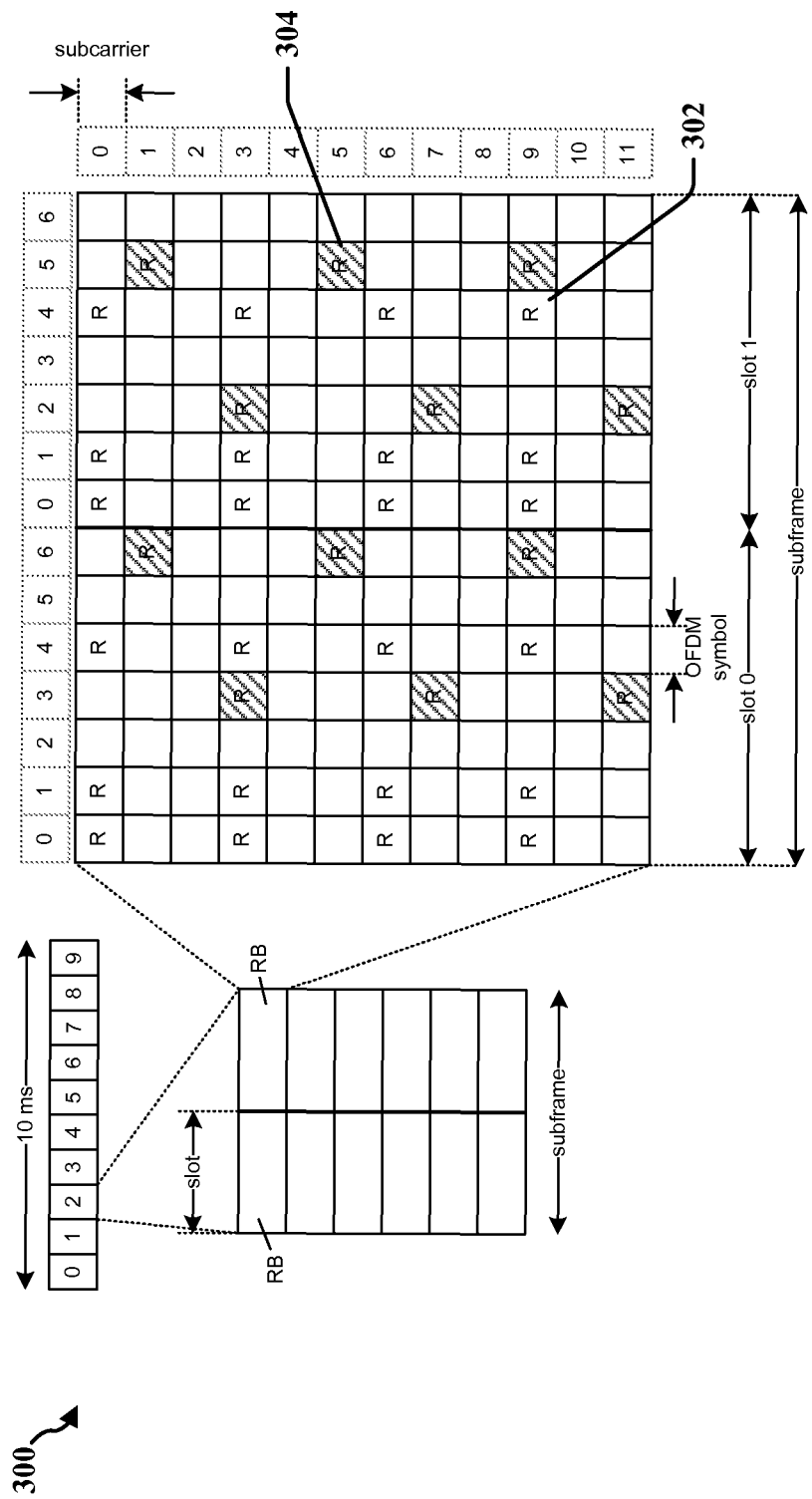
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
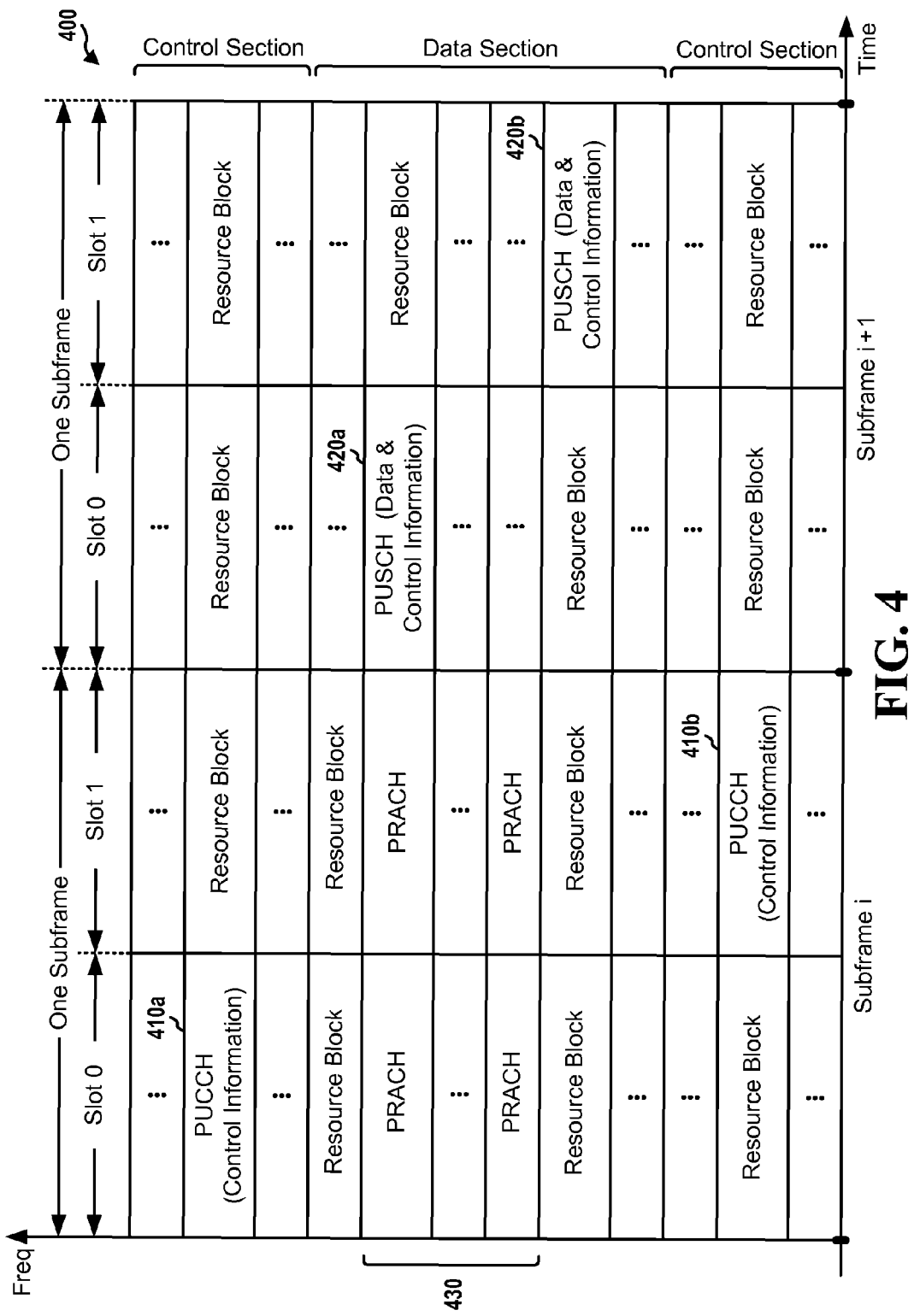
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
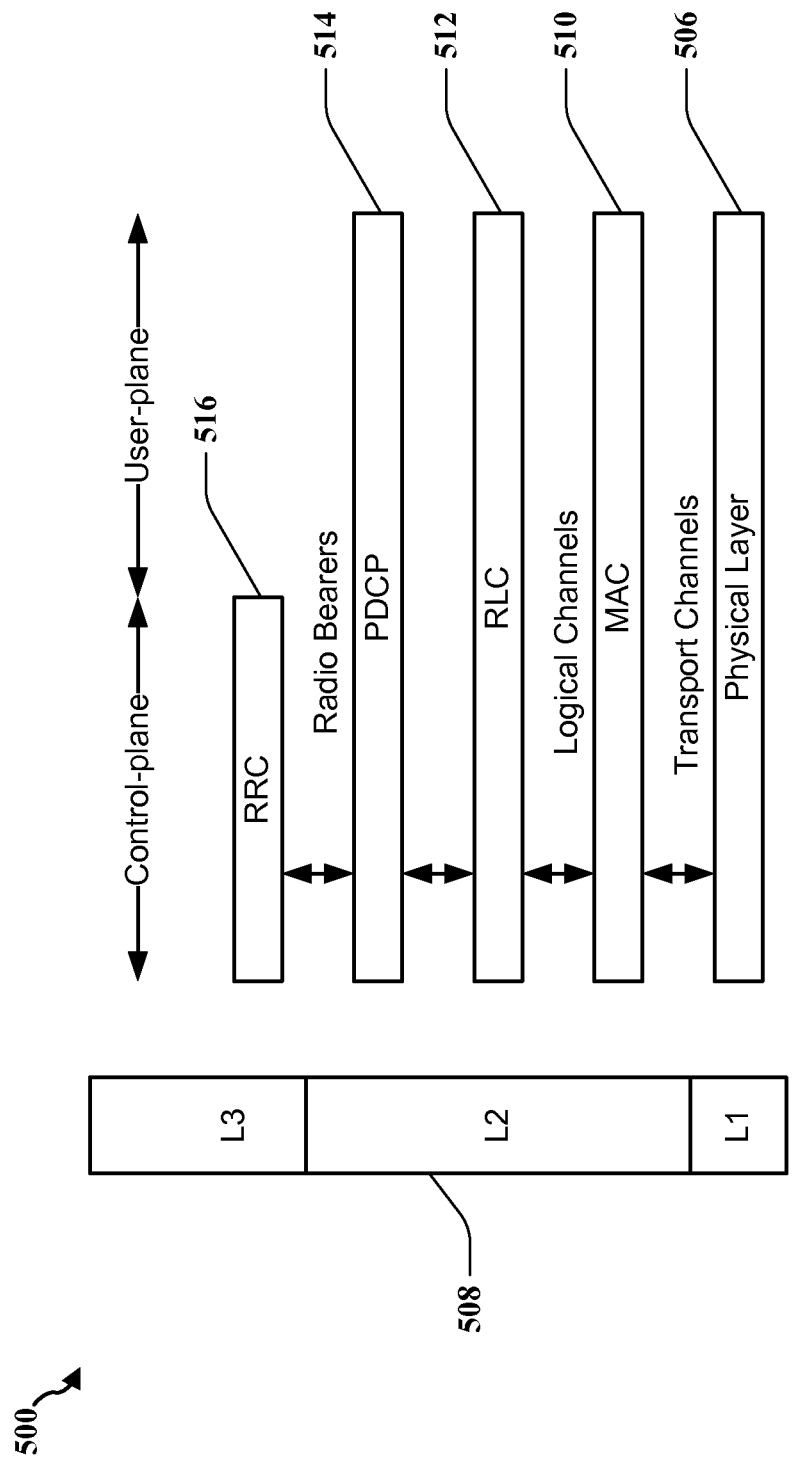
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
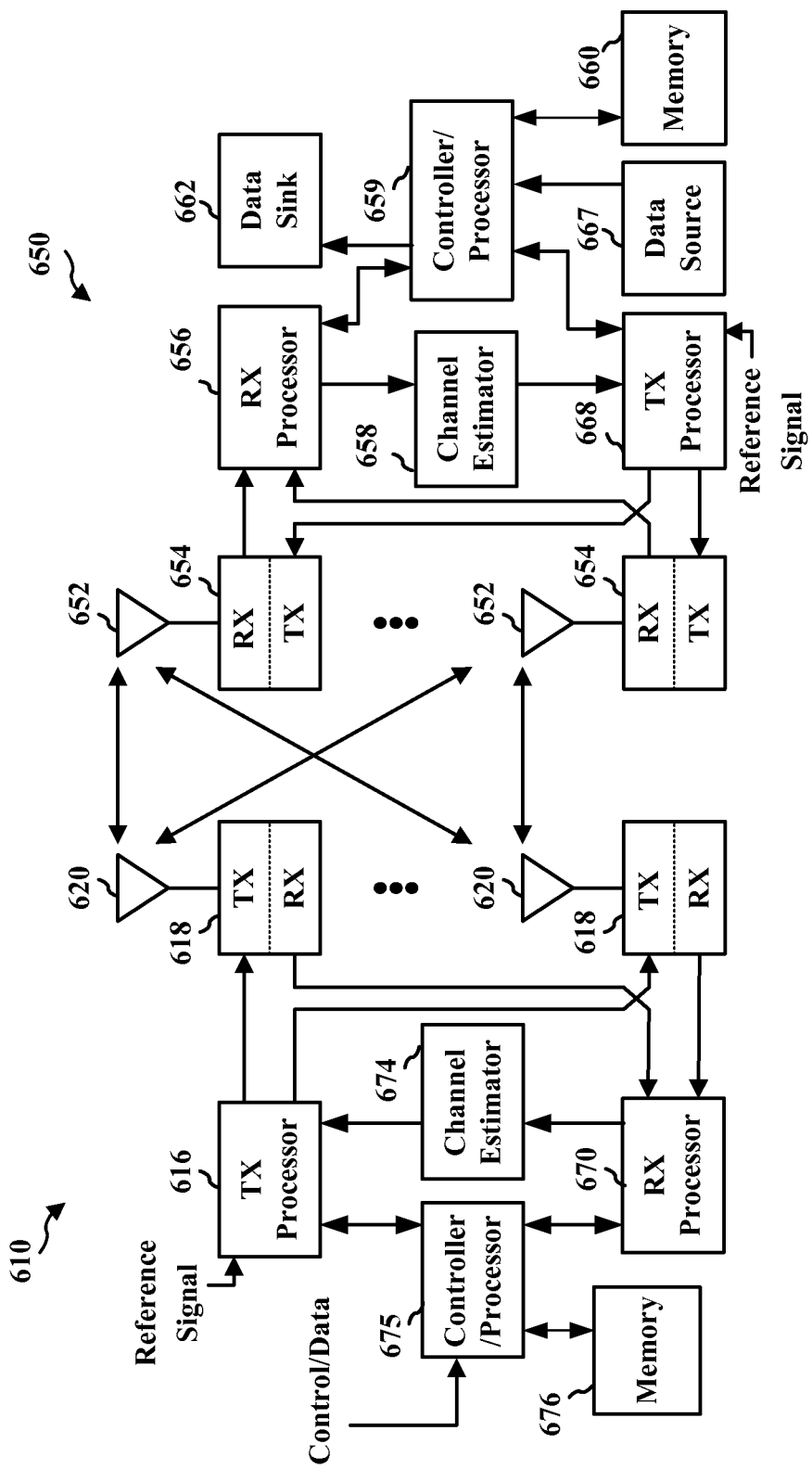
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
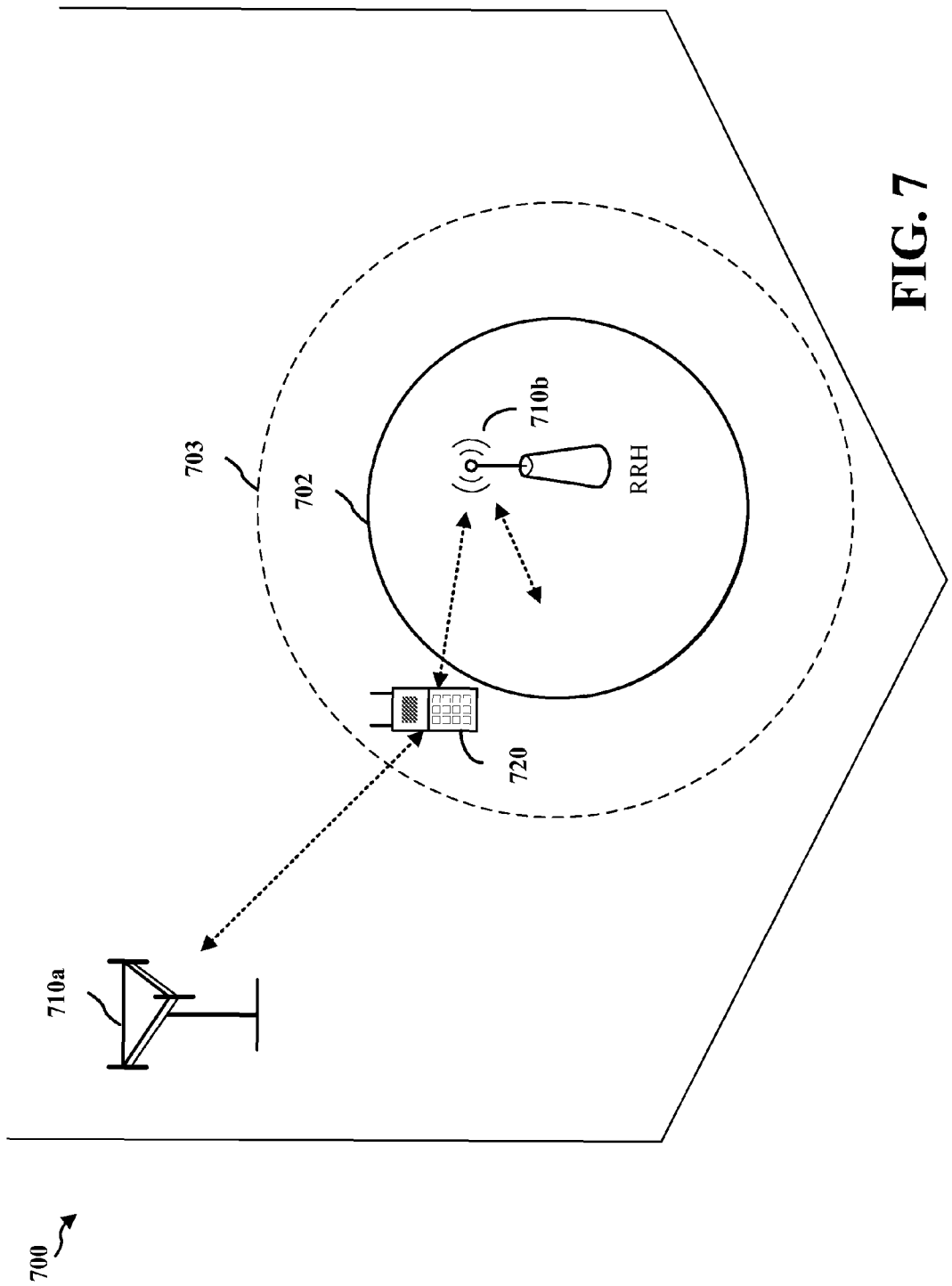
FIG. 7 is a diagram illustrating a range expanded cellular region in a heterogeneous network.

FIG. 7 is a diagram 700 illustrating a cell range expansion (CRE) region in a heterogeneous network. A lower power class eNB such as the pico 710b may have a CRE region 703 that extends beyond the region 702. The lower power class eNB is not limited to pico eNB, but may also be a femto eNB, relay, a remote radio head (RRH), etc. Pico 710b and the macro eNB 710a may employ enhanced inter-cell interference coordination techniques. UE 720 may employ interference cancellation. In enhanced inter-cell interference coordination, the pico 710b receives information from the macro eNB 710a regarding an interference condition of the UE 720. The information allows the pico 710b to serve the UE 720 in the range expanded cellular region 703 and to accept a handoff of the UE 720 from the macro eNB 710a as the UE 720 enters the range expanded cellular region 703.

Interference cancellation (IC) improves spectral efficiency, e.g., spectral efficiency in LTE/LTE-Advanced (LTE-A) DL. Interference cancellation can be applied to all physical channels and signals, including, e.g., PSS, secondary synchronization signal (SSS), physical broadcast channel (PBCH), CRS, demodulation reference signal (DRS), channel specific Information (CSI)-RS, physical control format indicator channel (PCFICH), physical hybrid ARQ indicator channel (PHICH), physical downlink control channel (PDDCH), and downlink shared channels such as PDSCH.

Aspects described herein provide a promising way for a UE to improve spectral efficiency in a downlink by performing SLIC by blindly estimating at least some of the necessary parameters in order to perform such IC.

Figure 8:
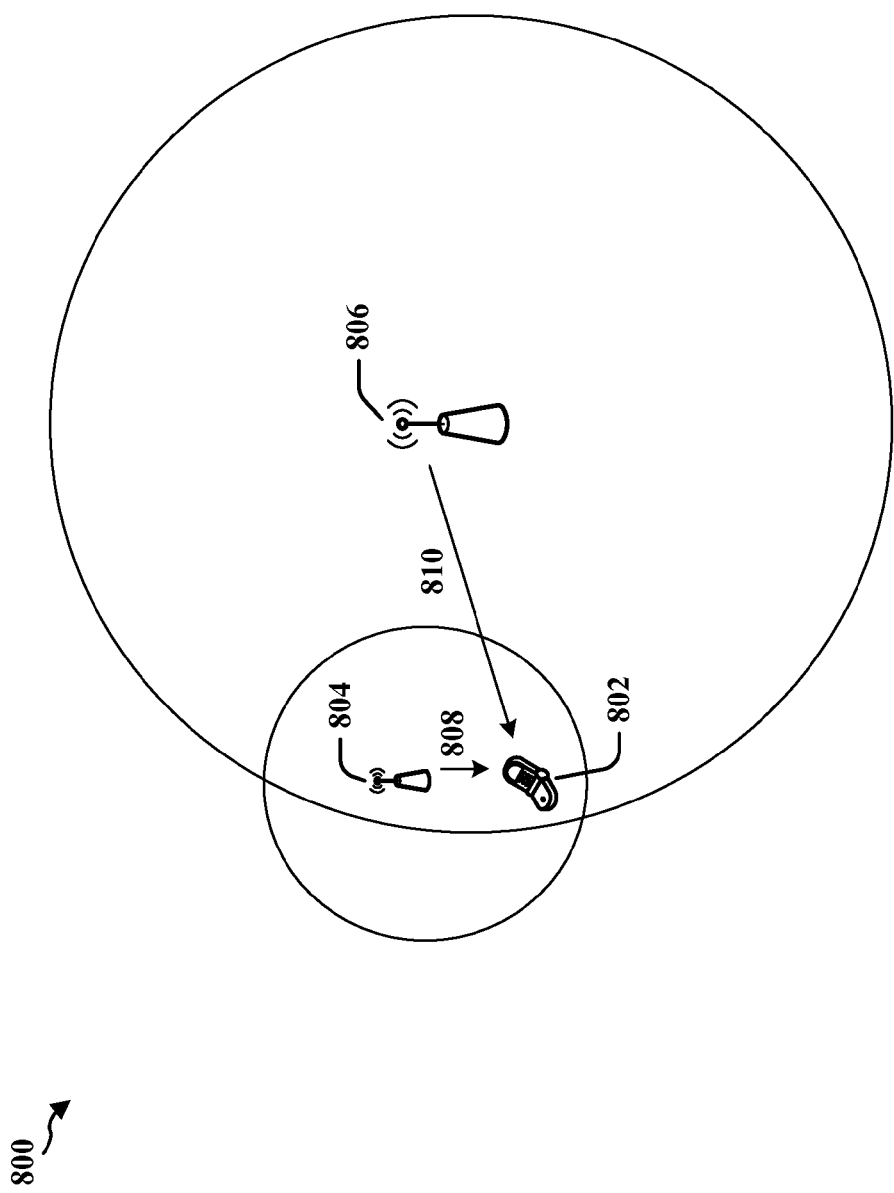
FIGS. 8 and 8A are diagrams for illustrating an example method.

FIG. 8 is a diagram 800 for illustrating a general overview for IC in a UE such as UE 802. As shown in FIG. 8, the UE 802 receives a signal 808/810 that includes a first signal 808 that originates from a first cell 804 and second signal 810 that originates from a second cell 806. The first cell 804 may be a serving cell, and the second cell 806 may be a neighboring cell. The UE 802 may attempt to cancel interference from the received signal 808/810 due to the second signal 810, as further described herein. For example, the UE may blindly estimate the necessary parameters in order to cancel such interference, e.g., due to the second signal, from the received signal 808/810, as described herein.

The second signal 810 may be any one of the physical channels and/or signals, such as a primary synchronization signal (PSS), a secondary synchronization signal (SSS), a physical broadcast channel (PBCH), a CRS, a demodulation reference signal (DRS), a channel state information reference signal (CSI-RS), a physical control format indicator channel (PCFICH), a physical hybrid automatic repeat request indicator channel (PHICH), a physical downlink control channel (PDCCH), a PDSCH, and the like. For simplicity in the discussion infra, it is assumed that the first signal 808 and the second signal are downlink shared channels, such as a PDSCH. However, the methods and apparatuses described are also applicable to control channels such as PCFICH, PHICH, or PDCCH.

PDSCH and/or control channel IC can be accomplished using two different approaches, namely Codeword-level IC (CWIC) and Symbol-level IC (SLIC). In CWIC, a UE may decode interfering data from a received interfering signal and cancel them. For example, the UE 802 may cancel interference due to the second signal 810 from the signal 808/810 by decoding the interfering data in the second signal 810 and canceling the decoded data from the signal 808/810. In order to perform CWIC, the UE 802 must receive certain parameters from the network.

In contrast, in SLIC, the UE 802 detects the interfering modulation symbols from a received interfering signal without decoding them and cancels the interfering modulation symbols. For example, the UE 802 may cancel interference due to the second signal 810 from the signal 808/810 by detecting modulation symbols in the second signal 810 and canceling the detected modulation symbols due to the second signal 810 from the signal 808/810. The SLIC approach generally has lower complexity but performs worse than CWIC.

To perform CWIC, the UE 802 needs to know the spatial scheme, the Modulation order and Coding Scheme (MCS), the transmission mode (e.g., whether it is based on UE-RS or CRS), the Resource Block (RB) allocation, the Redundancy Version (RV), the control region span (PCFICH value), and the TPR associated with the second signal 810.

To perform SLIC, the UE 802 needs to determine the spatial scheme, the modulation order, the transmission mode (e.g., whether it is based on UE-RS or CRS), the RB allocation, the control region span (PCFICH value), and the TPR associated with the second signal 810. All of the above information, with the exception of TPR, may be obtained by decoding the interfering PCFICH and PDCCH transmission associated with the interfering PDSCH. However, interfering PDCCH decoding will be challenging in general.

For non-unicast PDSCH transmissions, some parameters are fixed or known to the UE 802. For example, for non-unicast PDSCH transmission, the modulation order, is QPSK, the spatial scheme is space frequency block code (SFBC) for 2 TX antennas and SFBC-FSTD (Frequency Switched Transmit Diversity) for 4 TX antennas, and the RV is known for System Information Block 1 (SIB1) PDSCH. Some of the parameters may be estimated.

For unicast PDSCH transmissions, or if the above parameters are not known to the UE, the UE may be able to blindly determine and/or estimate at least one of the transmission mode, the modulation order, and the spatial scheme. The UE may also be able to determine the RB allocation (e.g., if there is only one interferer), and the TPR. However, there may be some performance loss in the interference cancellation. Other parameters, such as MCS and RV, may be harder to estimate.

Figure 8A:
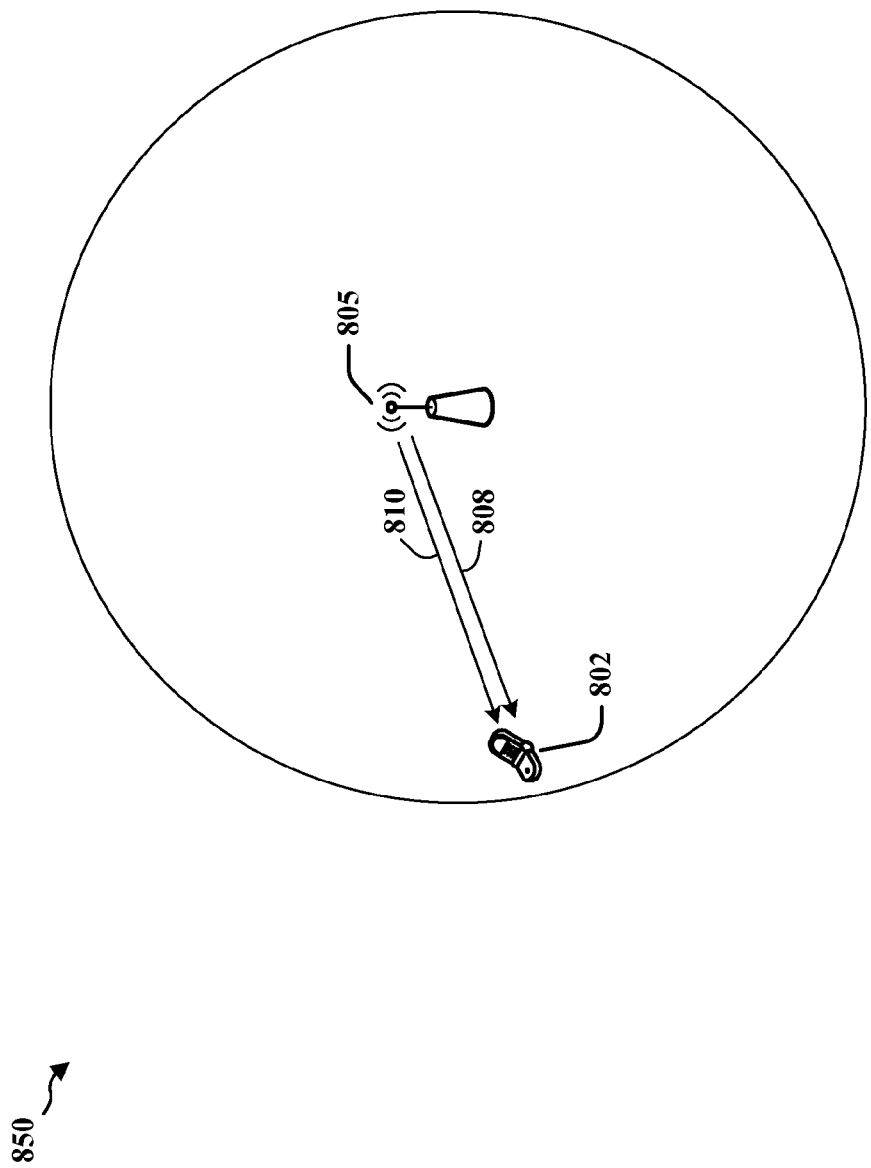

FIG. 8A is a diagram 850 for illustrating another aspect of the general overview for IC in a UE, such as UE 802, previously described with respect to the diagram 800 in FIG. 8. In the aspect of FIG. 8A, the signal 808/810 includes the first signal 808 that originates from the serving cell 805 and the second signal 810 that originates from the serving cell 805. In such aspect, the serving cell 805 may be configured as a single access point or as having multiple access points through the use of Remote Radio Heads (RHHs) connected via fiber or other low-latency mechanism. For example, the serving cell 805 may be configured to function as a serving cell that provides multi-user MIMO (MU-MIMO) support. The UE 802 may attempt to cancel interference from the combined received signal 808/810 caused by the second signal 810, as further described herein. For example, the UE 802 may blindly estimate the necessary parameters in order to cancel such interference, e.g., due to the second signal, from the received signal 808/810, as described herein.

Figure 9:
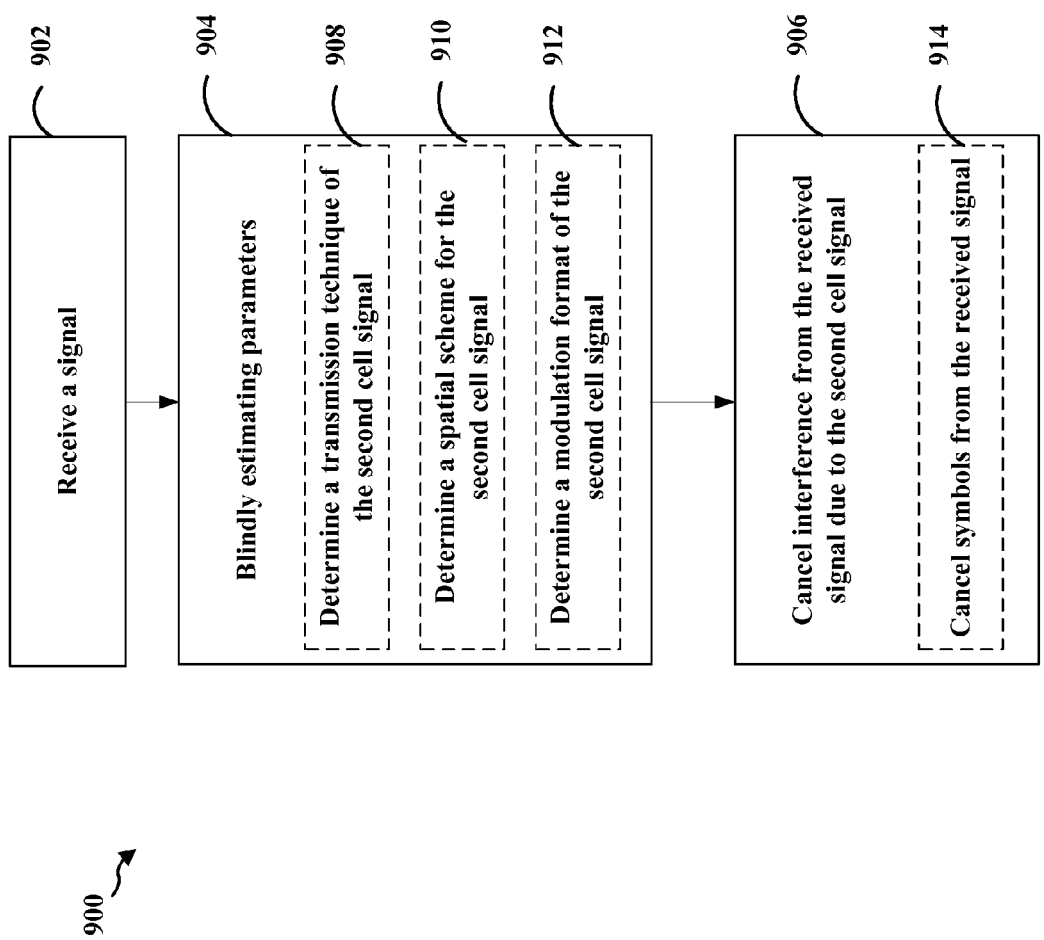
FIG. 9 is a flow chart of an example method of wireless communication.

FIG. 9 illustrates a method of wireless communication 900 at a UE, such as UE 802, for performing interference cancellation based on blind detection. In method 900, potential sub-steps are illustrated using a dashed line as opposed to a solid line. These potential steps are not necessary for implementation, but are optional, exemplary features of example method 900.

At step 902, the UE receives a signal (e.g., the combined signals 808/810), comprising a first signal (e.g., 808) and a second signal (e.g., 810). In an aspect, the first signal may originate, for example, at a serving cell, and the second signal may originate, for example, at a neighboring or non-serving cell. In another aspect, the first signal and the second signal may originate, for example, from the same cell. The received signal may include a downlink shared channel, e.g., a PDSCH, from the first cell and a downlink shared channel, e.g., a PDSCH, from the second cell. The received signal may include a control channel from the second cell. The second signal (e.g., from the non-serving cell) introduces interference into the received signal. Thus, it would be desirable to cancel interference in the received signal caused by the second signal.

At step 904, the UE blindly estimates parameters associated with decoding the second signal, the blind estimation including detecting parameters associated with at least one of a modulation format (where modulation format may include any of modulation scheme and modulation order) and a spatial scheme of the second signal. For example, the modulation format may include any of, e.g., BPSK, QPSK, M-QAM of different modulation orders (e.g. 16-QAM, 64QAM, 256QAM, etc), PSK of different modulation orders (e.g. 8PSK, etc), etc.

The estimation is made solely at the UE based on the received signal. In this approach, the estimation is made blindly rather than having the parameters provided by a network. Aspects may include a subset or all of the necessary parameters being derived from the network. For the parameters that are determined blindly, the determination may be made in the form of an estimated probability. For example, the blindly estimated parameters may include parameters associated with any of a transmission mode, a modulation format, and a spatial scheme of the second signal.

At step 906, the UE cancels interference from the received signal that is due to the second signal. The interference cancellation is performed using the blindly estimated parameters. Step 906 may include step 914 of cancelling symbols from the received signal. These cancelled symbols may be symbols from the second signal.

Figure 10:
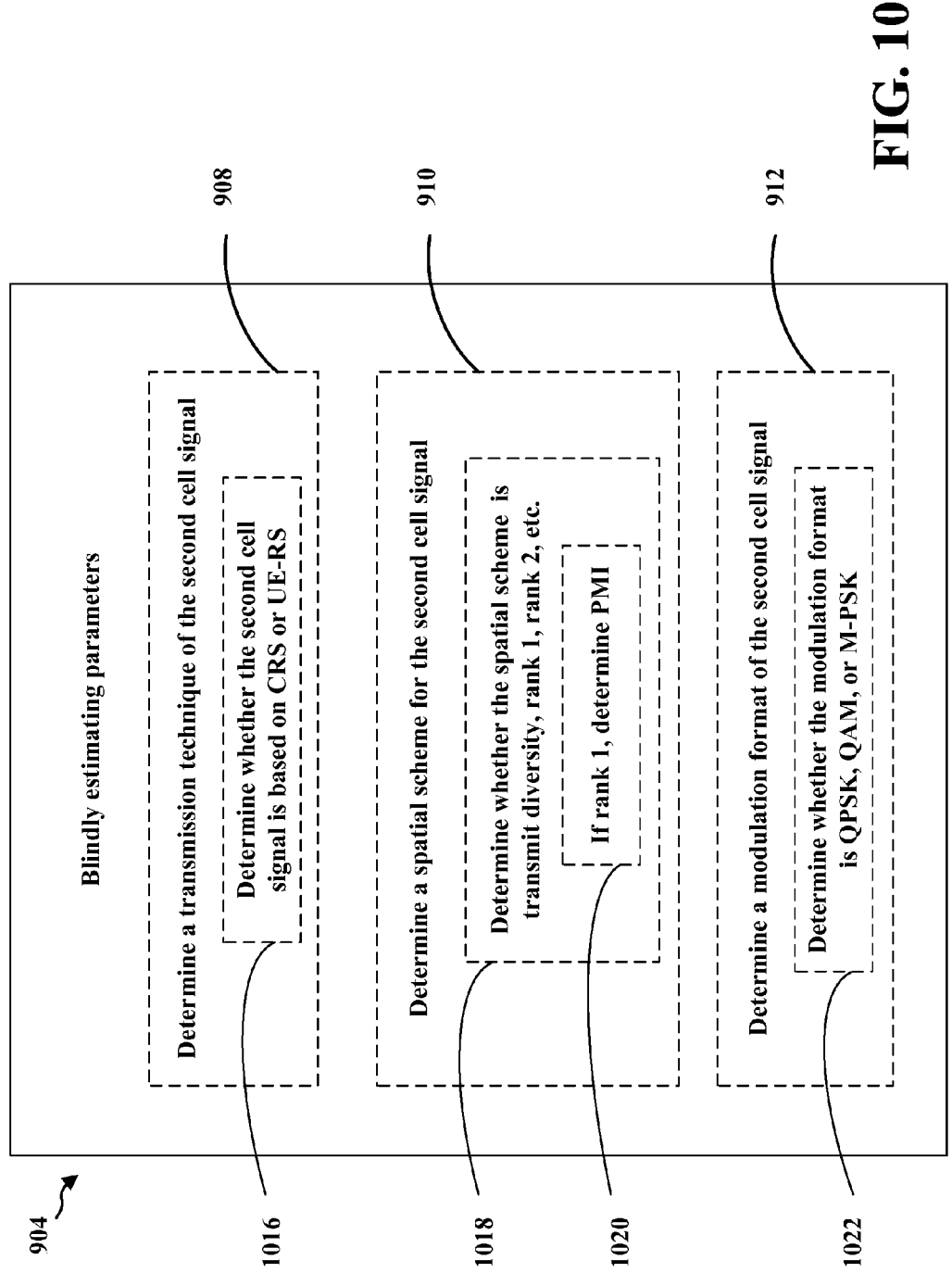
FIG. 10 is a flow chart of an example method of wireless communication.

The blind estimation of the parameters associated with the second signal may include any single or combination of determining a transmission technique of the second signal 908, determining a spatial scheme for the second signal 910, and determining a modulation format of the second signal 912. These determinations may be resource block-based or slot-based. Thus, the determination may be made, at least in part, based on whether the second signal is resource block based or slot based. Any combination of steps 908, 910, and 912 can be included as part of step 904. FIG. 10 illustrates potential substeps using a dashed line as opposed to a solid line. These potential steps are not necessary for implementation, but are optional, exemplary features. For example, determining the transmission technique of the second signal 908 may comprise determining whether the second signal is CRS or UE-RS based, as illustrated at step 1016. The determination of the transmission mode may be made, at least in part, based on whether the second signal is resource block-based or slot-based.

The determination of the spatial scheme for the second signal 910 may comprise determining a rank, e.g., whether the second signal uses a transmit diversity transmission, a rank 1 transmission, or a rank 2 transmission, or other rank transmission, as at step 1018. The transmit diversity transmission may be an SFBC transmission. Along with determining the rank, the determination of the spatial scheme further includes which Precoding Matrix Indicator (PMI) is used within the given rank, as at step 1020.

The determination of the spatial scheme for the second signal 910 may also comprise determining a plurality of probabilities corresponding to likelihoods or probabilities that the second signal is a transmit diversity transmission (e.g., an SFBC transmission), a rank 1 transmission, a rank 2 transmission, or other rank transmission.

The determination of the modulation format of the second signal 912 may comprise determining whether the modulation format is one of BPSK, QPSK, M-QAM of different modulation orders (e.g. 16-QAM, 64QAM, 256QAM, etc), and PSK of different modulation orders (e.g., 8-PSK, etc.), etc., as at step 1022.

The determination of the modulation format may include determining a plurality of probabilities corresponding to the likelihoods that the modulation format of the second signal is at least one of BPSK, QPSK, M-QAM of different modulation orders (e.g. 16-QAM, 64QAM, 256QAM, etc), and M-PSK of different modulation orders (e.g., 8-PSK, etc.), etc.

The determination of the transmission technique of the second signal can be made prior to the determination of the spatial scheme and the modulation format of the second signal, and the determination of the spatial scheme and the modulation format of the second signal can be made based, at least in part, on the determination of the transmission technique of the second signal. Thus, once the transmission technique is determined, the determined transmission technique can be used to determine the spatial scheme and the modulation format for the second signal.

The determination of the spatial scheme of the second signal and the determination of the modulation format of the second signal can be made in parallel, or the determinations can be performed in a predetermined order. For example, after the transmission technique of the second signal is determined, the determination of the spatial scheme of the second signal can be performed prior to the determination of the modulation format of the second signal.

The determination of the transmission technique can be used to provide weighted probabilities associated with a plurality of transmission techniques. Then, interference due to the second signal can be cancelled from the received signal based on the weighted probabilities associated with the plurality of transmission techniques. The plurality of transmission techniques may include CRS and UE-RS. For example, the transmission technique determination results can be used as a soft metric in order to determine an IC scheme. Thus, the UE may perform both CRS based PDSCH IC and UE-RS based PDSCH IC applied with weighted probabilities based on the blind determination of the transmission technique. For example, if the transmission technique determination resulted in a determination of 90% CRS and 10% UE-RS, the PDSCH IC may be applied using 90% CRS-based PDSCH IC and 10% UE-RS based PDSCH IC.

Figure 11:
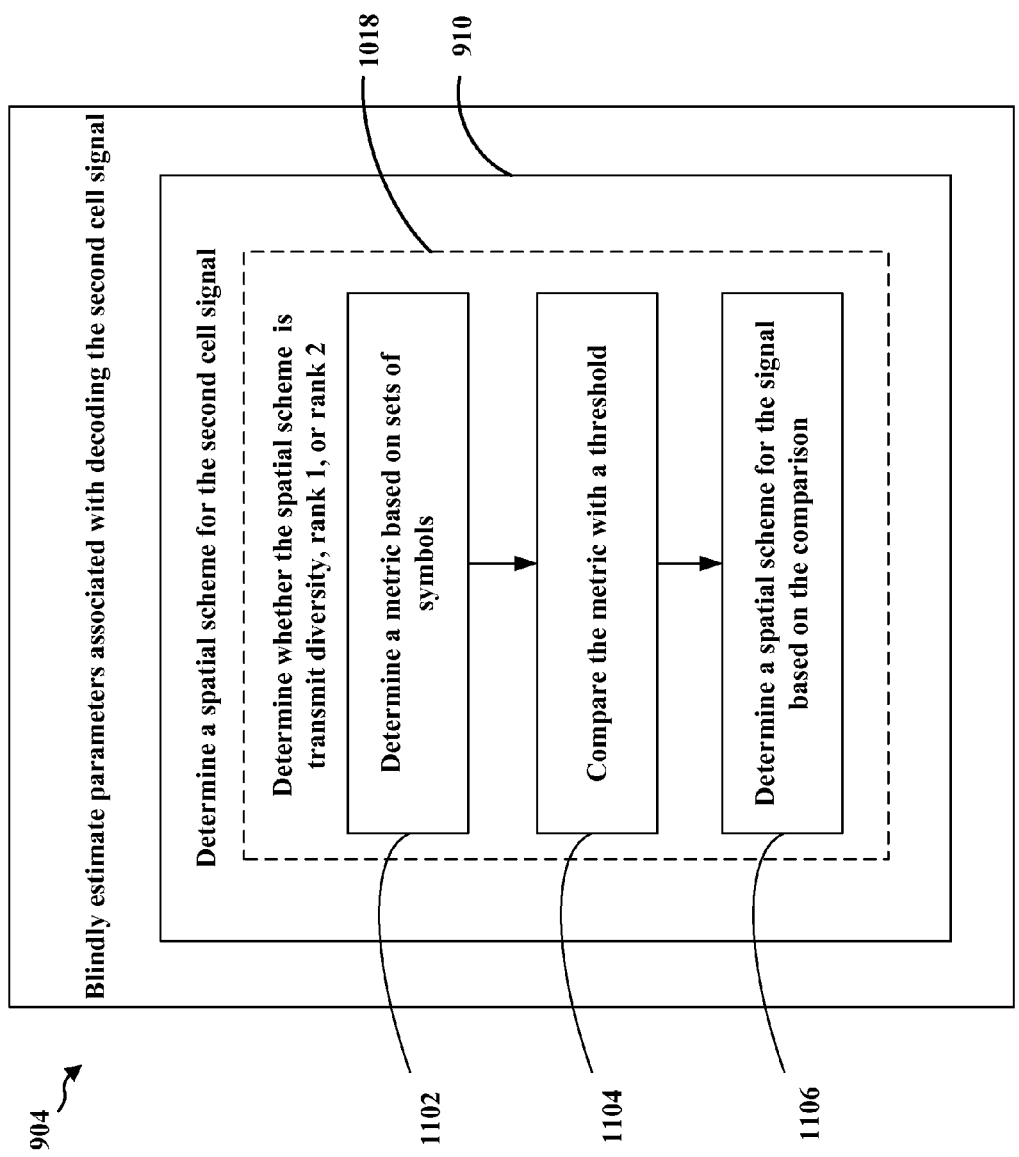
FIG. 11 is a flow chart of an example method of wireless communication.

FIG. 11 illustrates possible aspects of the spatial scheme detection process 910. As illustrated, these aspects may be comprised within step 904 in which the UE blindly estimates parameters. However, although the blind spatial scheme detection is shown here in the context of interference cancellation, such a determination can be useful in other applications. For example, another application may include the transmission of PDSCH without providing the spatial scheme in PDCCH.

The received signal (e.g., the combined signals 808/810), may comprise a first and second set of symbols. The first and second sets of symbols may be retrieved from the signal via an equalizer such as the MMSE equalizer 1710 in FIG. 17.

As part of determining a spatial scheme for the second signal 910, e.g., determining whether the spatial scheme is transmit diversity (SFBC), rank 1, or rank 2 at step 1018, the UE determines a metric based on the first set of symbols and the second set of symbols 1102. In one example algorithm where the metric is based on the distance between the two symbol sets, following the determination of the metric 1102, the UE compares the metric with a threshold 1104. If the difference between an estimated symbol and the corresponding symbol is larger than the threshold, then it would be unlikely that the spatial scheme that has been predicted is correct. However, if the difference is smaller than the threshold, then the predicted scheme is likely correct.

At 1106, the UE determines a spatial scheme associated with the at least one signal based on the comparison of the determined metric with a threshold.

Figure 12:
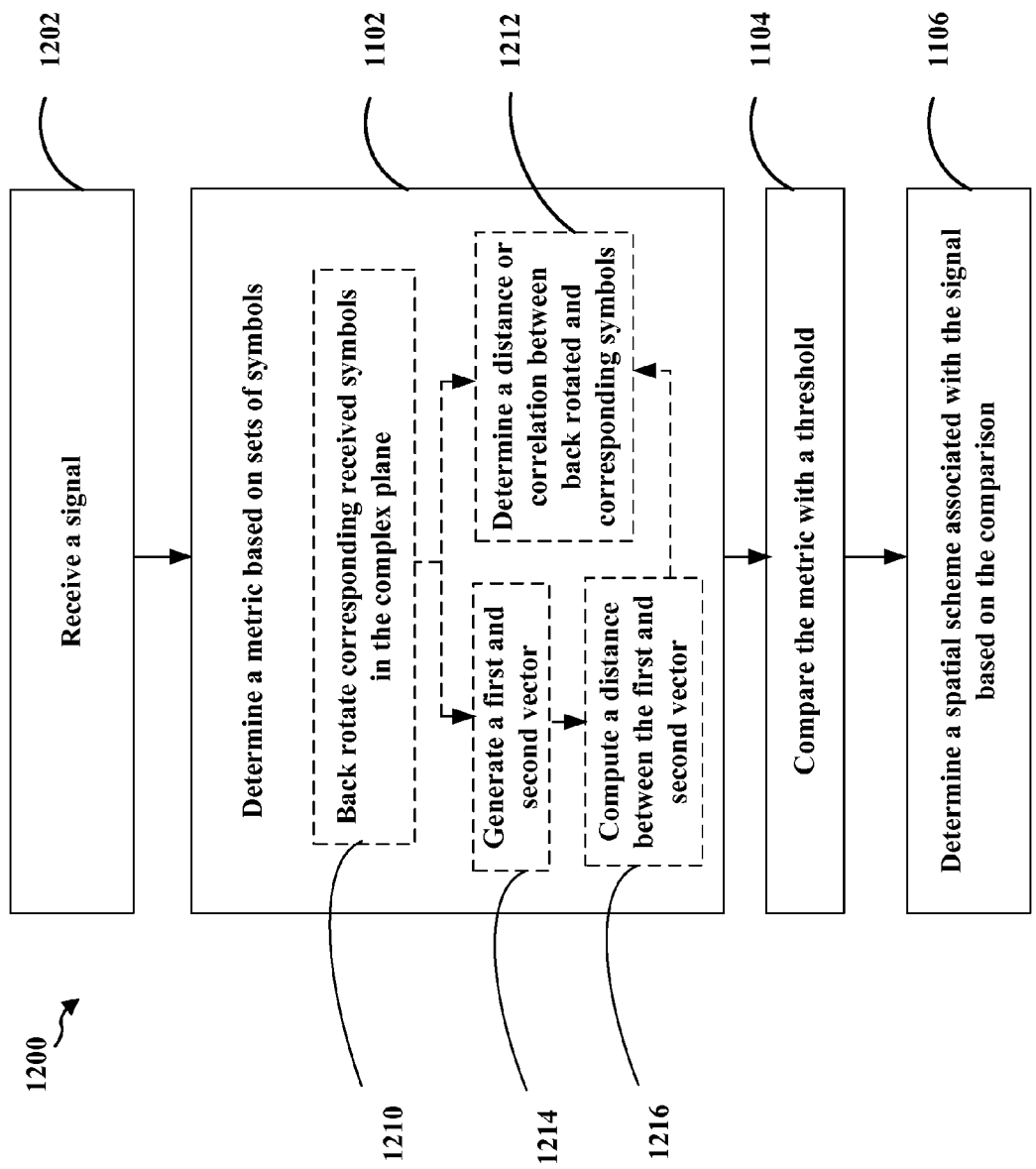
FIG. 12 is a flow chart of an example method of wireless communication.

FIG. 12 illustrates aspects of a Blind Spatial Scheme Detector (BSSD) detection process 1200 that can be used in wireless communication, one application of which is symbol level interference cancellation of a non-serving signal. The BSSD detection process receives a signal that includes a first and second set of symbols and generates an indication of the possible spatial scheme used to transmit the symbols, which maybe SFBC, rank 1, rank 2, or other rank in one aspect of the disclosed approach. Optional substeps are illustrated with a dashed line.

At step 1202, a signal that comprises a first set of symbols and a second set of symbols is received at a UE. As previously disclosed, the signal may include a first signal, e.g., originating from a serving cell, and a second signal, e.g., originating from a non-serving, neighboring cell. The UE may attempt to cancel interference from the received signal due to the second signal. The first and second set of symbols may be retrieved from the signal from a equalizer such as the MMSE equalizer 1710 described in connection with FIG. 17.

At step 1102, the UE determines a metric based on the first set of symbols and the second set of symbols. This may include backrotating the received symbols in the complex plane 1210. As discussed above, the two of the transmitted symbols are based on the same data symbol. Back rotation will allow the transmitted symbols to be compared more readily. The back rotated symbols can be compared to their corresponding counterpart symbols to determine how close they are to each other in a distance or correlation-based approach 1210. For example, if the difference between the back rotated symbols and the corresponding symbols is small, which would be as expected if the spatial scheme assumption is correct, then the difference should be small or non-existent. The back rotation may be performed based on a structure of at least one spatial scheme from a set of potential spatial schemes that can be detected.

As described herein, a first vector can be generated based on the first set of symbols, and a second vector can be generated based on the second set of symbols at 1214. The first vector and the second vector may comprise symbols having a signal-to-noise ratio value above a minimum signal-to-noise ratio. Generating the first vector and the second vector may include processing equalizer output for the first set of symbols and the second set of symbols. Determining the metric may include computing a distance between the first vector and the second vector, computing correlation between the first vector and second vector, or more generally, computing the likelihood of equivalence of the first vector and second vector 1212. Step 1212 may be based at least in part on the computation of a distance between the first vector and the second vector 1216.

At step 1104, following the determination of the metric 1102, he UE compares the metric with a threshold. As noted above, in case of the distance-based algorithm, if the metric (i.e. difference) is larger than the threshold, then it would be unlikely that the spatial scheme that has been predicted is correct. However, if the difference is smaller than the threshold, then the predicted scheme is likely correct.

In case of the correlation-based algorithm, if the metric (i.e. correlation) is larger than the threshold, then the predicted scheme is likely correct. In case the metric is the likelihood of equivalence, if the metric is larger than the threshold, then the predicted scheme is likely correct.

Instead of making a hard decision on being the given spatial scheme, the UE may determine probability of being the given spatial scheme based on the metric. For example, the UE may determine that based on the computed metric, it is SFBC with 70% probability and it is not SFBC with 30% probability.

Based on the comparison, a spatial scheme can be determined associated with the at least one signal at step 1106. For example, the method may include detecting symbols or decoding a data stream based on the determined spatial scheme. Interference cancellation may then be performed using at least one of the detected symbols or decoded data stream, as illustrated in connection with FIGS. 10 and 11.

A. SFBC Based Determination

The structure inherent in the SFBC and/or rank 1 design can be used to make a blind determination of the spatial scheme for a non-serving signal. For example, the symbols transmitted by 2 TX antennas are related by precoding matrices. Those relationships can be used to blindly determine unknown parameters of the signal, e.g., a spatial scheme of the signal. In the SFBC scenario, two signals are received over each of two SFBC-encoded tones at the UE 802, each on a different receive antenna. These two signals correspond to each other, and are given by the equations:

$$y_1[k]=h_{11}[k]\cdot s_1[k]+h_{21}[k]\cdot s_2[k], \quad [1]$$

and $$y_2[k+1]=h_{12}[k+1]\cdot s_1[k+1]+h_{22}[k+1]\cdot s_2[k+1], \quad [2]$$

where:
k, k+1 are the tone indices;
$s_i$ is the transmitted symbol from TX antenna i;
$h_{ij}$ is the channel gain from TX antenna i to RX antenna j; and
$y_j$ is the received signal on RX antenna j.

For example, the $h_{21}$ is the channel gain from the 2nd TX antenna to the 1st RX antenna. As shown by equations [1] and [2], a pair of symbols is transmitted in each signal. Thus, four symbols are transmitted. The four transmitted symbols include:

$$s_1[k]=x_1[k], \quad [3]$$

$$s_2[k]=-x_2^*[k], \quad [4]$$

$$s_1[k+1]=x_2[k], \quad [5]$$

and $$s_2[k+1]=x_1^*[k], \quad [6]$$

where $x_i[k]$ is the data symbol transmitted data from TX antenna i. As illustrated by formulas [3] to [6], two out of four transmit symbols in SFBC depend on the same data symbol. Specifically, symbols $s_1[k]$ and $s_2[k+1]$ are complex conjugates of each other. The present approach for BSSD utilizes this property for SFBC detection. As discussed above, in one aspect of the BSSD process disclosed herein, the detection for SFBC includes backrotating the corresponding symbols in the complex plane by reverting the complex conjugation. In a more general sense arbitrary mappings between data symbols and transmit symbols can be reverted including any combination of phase rotation, amplitude scaling, and complex conjugation.

If there are tones having very low SNR, for example, due to fading or other non-interference factors, the detection results may be impacted. Thus, in one aspect, thresholds may be set up such that when the SNR value for a tone is below a threshold the tone will be ignored in the detection. The actual level of the threshold may be determined by one of ordinary skill of the art.

1. SFBC Distance Based Detection

The second portion of the BSSD process includes a distance or correlation-based decision rule. In the distance-based decision process, the output of the equalizer in UE 802 due to tone k for antenna i=1, 2 may be represented by the following formula:

$$\hat{s}_i[k]=SNR_i[k]\cdot s_i[k]+\sqrt{SNR_i[k]}\cdot n_i[k], \quad [7]$$

where $\hat{s}$ is an estimation of $s_i$, and n is the error or noise term with zero mean and unit variance. A distance vector d for SFBC may be determined by the following formula:

$$d=\hat{s}_a-\hat{s}_b=\left[\frac{n_1[0]}{\sqrt{SNR_1[0]}}-\frac{n_2^*[1]}{\sqrt{SNR_2[1]}};\right. \quad [8]$$

$$\left.\frac{n_1[1]}{\sqrt{SNR_1[1]}}+\frac{n_2^*[0]}{\sqrt{SNR_2[0]}};\ldots\right],$$

where $\hat{s}_a$ and $\hat{s}_b$ are noisy estimates of $s_a$ and $s_b$, respectively, given by:

$$\hat{s}_a = \left[\frac{\hat{s}_1[0]}{SNR_1[0]}; \frac{\hat{s}_1[1]}{SNR_1[1]}; \cdots ; \frac{\hat{s}_1[N-2]}{SNR_1[N-2]}; \frac{\hat{s}_1[N-1]}{SNR_1[N-1]}\right] \quad [9]$$

$$= s_a + \left[\frac{n_1[0]}{\sqrt{SNR_1[0]}}; \frac{n_1[1]}{\sqrt{SNR_1[1]}}; \right. \quad [10]$$

$$\left. \cdots ; \frac{n_1[N-2]}{\sqrt{SNR_1[N-2]}}; \frac{n_1[N-1]}{\sqrt{SNR_1[N-1]}}\right],$$

and $$\hat{s}_b = \left[\frac{\hat{s}_2^*[1]}{SNR_2[1]}; \frac{-\hat{s}_2^*[0]}{SNR_2[0]}; \cdots ; \frac{\hat{s}_2^*[N-1]}{SNR_2[N-1]}; \frac{-\hat{s}_2^*[N-2]}{SNR_2[N-2]}\right] \quad [11]$$

$$= s_b + \left[\frac{n_2^*[1]}{\sqrt{SNR_2[1]}}; \frac{-n_2^*[0]}{\sqrt{SNR_2[0]}}; \right. \quad [12]$$

$$\left. \cdots ; \frac{n_2^*[N-1]}{\sqrt{SNR_2[N-1]}}; \frac{-n_2^*[N-2]}{\sqrt{SNR_2[N-2]}}\right].$$

where N denotes the total number of tones available for the detection. Thus, there are N symbols per TX antenna. $s_a$ and $s_b$ are one dimensional vectors. A complex conjugate is applied to $s_b$. If there is no noise, $\hat{s}_a$ and $\hat{s}_b$ should be identical and d would equal zero if the transmitted scenario is SFBC.

If there is noise, the mean of $\|d\|^2$ is given by the formula:

$$\frac{1}{\sum_{k=0}^{N-1}\left(\frac{1}{SNR_1[k]} + \frac{1}{SNR_2[k]}\right)}. \quad [13]$$

Thus, a distance-based SFBC detection rule with a threshold $t_d$ may be represented by the formula:

$$\tilde{d} = \frac{\|d\|^2}{\sum_{k=0}^{N-1}\left(\frac{1}{SNR_1[k]} + \frac{1}{SNR_2[k]}\right)} < t_d. \quad [14]$$

2. SFBC-Correlation-Based Detection

In a correlation-based detection process, if the signal is SFBC, the following properties will be observed:

$$E\{s_1[k] \cdot s_2[k+1]\} = E\{|x_1|^2\} = 1, \quad [15]$$

$$E\{s_2[k] \cdot s_1[k+1]\} = -E\{|x_2|^2\} = -1, \quad [16]$$

$$E\{s_1[k] \cdot s_1[k+1]\} = 0, \text{ and} \quad [17]$$

$$E\{s_2[k] \cdot s_2[k+1]\} = 0, \quad [18]$$

If the signal is not SFBC-based, then all the symbols will be different, and [15]-[18] will be zero. The correlation-based detection process may utilize this property to differentiate SFBC versus non-SFBC scenarios by estimating correlations among pairs of symbols, and comparing the correlations against thresholds. For example, a correlation may be estimated between [15] and [16]. The thresholds may be determined by one of ordinary skill in the art.

Thus, in connection with the example illustrated in FIG. 11, $\hat{s}_a$ and $\hat{s}_b$ can be constructed, where $\hat{s}_a$ and $\hat{s}_b$ are noisy estimates of $s_a$ and $s_b$. These estimates can be constructed from the output received from the equalizer 1710.

The metric determined based on the first and second set of symbols 1102 may be a distance or a correlation metric. For the distance metric, the distance vector d for SFBC can be determined according to equation [8].

The determined distance may be compared with a threshold, e.g., as in 1104, using equation [14]. As illustrated by the equation, the distance may be compensated by the SNR of each respective symbol. In another approach, correlation of the symbols may be made using the properties shown by equations [15]-[18]. As an example, the correlations would be small in magnitude or zero if the transmission is not SFBC.

The UE determines a spatial scheme associated with the at least one signal based on the comparison 1106. For example, the spatial scheme may be determined to be based on SFBC if the comparison given by equation [14] is true for the threshold for SFBC. In another example, the spatial stream may be determined to be SFBC if the correlations as compared using equations [15]-[18] is over the threshold.

B. Rank 1 Based Determination

The BSSD process 1200, as illustrated in connection with FIGS. 11 and 12 may also be applied to the rank 1 scenario. For rank 1 transmissions, two signals are received at each tone at the UE 802 on each receive antenna:

$$y_1[k] = h_{11}[k] \cdot s_1[k] + h_{21}[k] \cdot s_2[k], \quad [19]$$

and $$y_2[k] = h_{12}[k] \cdot s_1[k] + h_{22}[k] \cdot s_2[k], \quad [20]$$

where:
k is the tone index;
$s_i$ is the transmitted symbol from TX antenna i;
$h_{ij}$ is the channel gain from TX antenna i to RX antenna j; and
y is the received signal on RX antenna j.

A pair of symbols is transmitted in the signal. The two transmitted symbols include:

$$s_1[k] = w_1 \cdot x[k], \quad [20]$$

and $$s_2[k] = w_2 \cdot x[k], \quad [21]$$

where:

$$w = \begin{bmatrix} w_1 \\ w_2 \end{bmatrix}, \quad [22]$$

where w is a rank 1 precoding vector, and x[k] is the data symbol prior to precoding.

For a 2 TX eNB, w may take one of 4 values:

$$w = \begin{bmatrix} w_1 \\ w_2 \end{bmatrix} = \begin{bmatrix} 1 \\ 1 \end{bmatrix}, \begin{bmatrix} 1 \\ -1 \end{bmatrix}, \begin{bmatrix} 1 \\ j \end{bmatrix}, \text{ or } \begin{bmatrix} 1 \\ -j \end{bmatrix}. \quad [23]$$

As illustrated by formulas [20] to [21], the two symbols transmitted by the eNB in rank 1 depend on the same data symbol. Specifically, considering the possible values of w, symbols $s_1[k]$ and $s_2[k]$ may be identical or variations of each other. The present approach for BSSD utilizes this property for rank 1 and PMI detection. In one aspect of the BSSD detection process disclosed herein, the detection for rank 1 and PMI includes backrotating a corresponding symbol in the complex plane.

The second portion of the BSSD process includes applying a distance or correlation-based decision rule.

1. Rank 1 Distance-Based-Detection

For the distance-based decision process, the output of the equalizer in UE 802 due to tone k for antenna i=1, 2 may be represented by the formula:

$$\hat{s}_i[k]=SNR_i[k]\cdot s_{i[k]}+\sqrt{SNR_i[k]}\cdot n_i[k] \qquad [24]$$

In this aspect, one detector for each of the possible values of the precoding matrix w is used to detect the plurality of symbols sent in the signal. Thus, 4 detectors are needed in case of a 2 TX eNB. Each detector is identical to the SFBC detector, except that:

$$\tilde{s}_a = \left[\frac{\hat{s}_1[0]}{w_1\cdot SNR_1[0]}; \frac{\hat{s}_1[1]}{w_1\cdot SNR_1[1]}; \ldots; \frac{\hat{s}_1[N-2]}{w_1\cdot SNR_1[N-2]}; \frac{\hat{s}_1[N-1]}{w_1\cdot SNR_1[N-1]}\right], \qquad [25]$$

and $$\tilde{s}_b = \left[\frac{\hat{s}_2[0]}{w_2\cdot SNR_2[0]}; \frac{\hat{s}_2[1]}{w_2\cdot SNR_2[1]}; \ldots; \frac{\hat{s}_2[N-2]}{w_2\cdot SNR_2[N-2]}; \frac{\hat{s}_2[N-1]}{w_2\cdot SNR_2[N-1]}\right], \qquad [26]$$

where N symbols are transmitted by each TX.

This relationship can be used in connection with equations [8], [13], and [14] above to determine a distance between the symbols.

2. Rank 1 Correlation-Based-Detection

In another aspect of the proposed BSSD approach, a correlation-based detection process may be used, where the following properties will be observed for rank 1:

$$E\{s_1[k]\cdot s_2^*[k]\}=E\{w_1w_2^*|x_1|^2\}=w_1w_2^*, \qquad [27]$$

where if the signal is not rank 1-based, then the symbols will be different and not correlated, and:

$$E\{s_1[k]\cdot s_2^*[k]\}=0. \qquad [28]$$

The correlation-based detection process may utilize these properties to differentiate rank 1 versus non-rank 1 scenarios by estimating correlations among pairs of symbols, and comparing the correlations against thresholds. For example, a correlation may be estimated between [28] and [29]. The thresholds may be determined by one of ordinary skill in the art.

C. Estimation of Parameters Using Constellations

Blind spatial scheme and modulation format detection may not always perform as desired, particularly if the non-serving signal strength is not sufficiently high. This may result, at times, in the modulation format or the spatial scheme for the non-serving signal being unknown or uncertain. Aspects are therefore proposed for working with an unknown or uncertain modulation format and/or spatial scheme. Among other applications, such aspects may be applied as an optional aspect of blind symbol level interference cancellation.

Aspects of an unknown spatial scheme and modulation format for a received signal can be determined in the manner illustrated in FIG. 13.

At step 1302, a signal is received.

At step 1304, a determination is made that at least one of a spatial scheme and a modulation format is unknown or uncertain.

Thereafter, at step 1306, a plurality of constellations are determined. Each of the constellations comprises a plurality of points associated with possible transmitted symbols for a potential spatial scheme and modulation format combination.

At step 1308, a probability weight is determined for each constellation. The probability weight for each of the constellations may be determined based on at least one of assigned values, a spatial scheme detection, a modulation format detection, and previous communication with a cell or transmitter.

The probability of each spatial scheme and modulation format can be used to perform symbol level interference cancellation, e.g., as at step 1310. However, this is illustrated as an optional step with a dashed line, because the blind determination of the unknown spatial scheme and modulation format described in connection with steps 1302 to 1308 can be used in other applications as well. The symbol level interference cancellation may be performed based at least in part on an extended constellation of all possible transmitted modulated symbols, the extended constellation comprising a union of the plurality of constellations. The probability of each symbol within the extended constellation may be determined based at least in part on the determined probability weight of the constellation to which the symbol belongs.

The extended constellation may include all potential received symbol points for all possible spatial schemes and modulation format combinations. The extended constellation may be created with a probability weight assigned to each of the plurality of constellations, and correspondingly each constellation point. Once the extended constellation has been constructed, and the probabilities of the constellation points have been determined, they may be passed on to a processing block for performing symbol level interference cancellation.

Figure 14C:
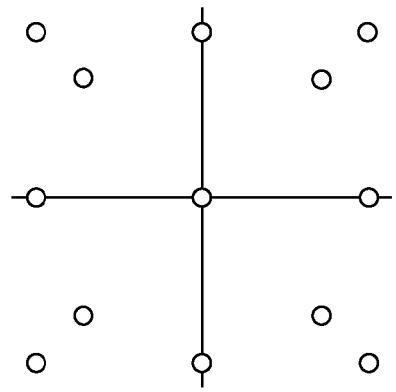
FIGS. 14A-C are example transmission constellations for wirelessly transmitted symbols.
Figure 14B:
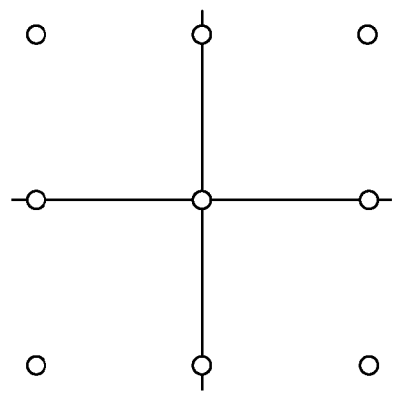
Figure 14A:
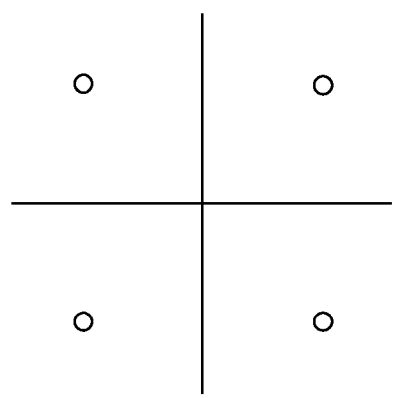

FIGS. 14A-C illustrate examples of potential constellations for an unknown spatial scheme, for QPSK modulation format. The formula for symbol 1 is:

$$s_1 = \pm\frac{1}{\sqrt{2}} \qquad [30]$$

Similarly, the formula for symbol 2 is:

$$s_2 = \pm\frac{1}{\sqrt{2}} \qquad [31]$$

For a particular modulation scheme, the potential symbol locations for each potential spatial scheme may be determined. For example, for QPSK modulation, the potential location for the symbols based on the possible spatial schemes are given by:

$$SFBC: \frac{1}{\sqrt{2}}\tilde{s}_i = \pm\frac{1}{2} \pm j\frac{1}{2} \qquad [32]$$

$$LCDD: \frac{1}{2}(\tilde{s}_1+\tilde{s}_2) = \left(+\frac{1}{\sqrt{2}}, 0, -\frac{1}{\sqrt{2}}\right)+j\left(+\frac{1}{\sqrt{2}}, 0, -\frac{1}{\sqrt{2}}\right) \qquad [33]$$

$$TM4\text{ Rank }1: \frac{1}{\sqrt{2}}\tilde{s}_i = \pm\frac{1}{2} \pm j\frac{1}{2} \qquad [34]$$

-continued $$TM4 \text{ Rank 2: } \frac{1}{2}(\tilde{s}_1 + \tilde{s}_2) = \quad [35]$$

$$\left(+\frac{1}{\sqrt{2}}, 0, -\frac{1}{\sqrt{2}}\right) + j\left(+\frac{1}{\sqrt{2}}, 0, -\frac{1}{\sqrt{2}}\right)$$

where $\tilde{s}_i$ is one of $s_i$, $-s_i$, $js_i$, or $-js_i$.

where LCDD is large cyclic delay diversity. Potential received symbols for the above equations may be plotted on a graph, as shown in FIGS. 14A-C For a cell having a 2 TX configuration, the transmission from each transmit antenna may be different based on the spatial scheme. If SFBC is used, each antenna broadcasts one symbol at a time. For QPSK modulation, symbol $s_1$ is represented by one of the four points illustrated in FIG. 14A. As the symbol for the signal from second antenna is the same, $s_2$ can be represented by the same four points illustrated in FIG. 14A. For the QPSK example shown in FIGS. 14A-C, SFBC and TM4 rank 1 spatial schemes share the same four potential symbol points. Thus, the four points illustrated in FIG. 14A correspond to the four potential points for symbols $s_1$ and $s_2$ for either SFBC or rank 1 spatial schemes.

If LCDD or rank 2 spatial schemes are used, the antennas may transmit something different. Thus, e.g., if rank 2 precoding is used, each antenna may broadcast a mix of two QPSK symbols, e.g., symbols $s_1$ and $s_2$ from equations 30 and 31 above. FIG. 14B illustrates the nine potential symbols points for LCDD and TM4 rank 2. LCDD and rank 2 share these same nine potential points.

FIG. 14C illustrates an extended constellation combining the four potential points corresponding to SFBC and TM4 rank 1 spatial schemes, as in FIG. 14A, with the nine potential points corresponding to LCDD and TM4 rank 2 spatial schemes, as in FIG. 14B. Thus, there are 13 total potential transmitted symbol points for the potential spatial schemes having QPSK modulation. FIG. 14C illustrates each of these potential transmitted symbols in an extended constellation for a transmit antenna with an unknown spatial scheme for a QPSK modulation format.

The example illustrated in FIGS. 14A-C assumes that the modulation format is QPSK. If the modulation format is known or is found highly probable to be QPSK, the extended constellation in FIG. 14C may illustrate all of the possible transmitted modulated symbols. If a modulation format is unknown, multiple such constellations may be constructed for each potential modulation format. In LTE/LTE-A PDSCH transmission, potential modulation formats are QPSK, 16-QAM, and 64-QAM. An unknown modulation format leads to a larger extended constellation, with more combinations of constellations for each possible spatial scheme and modulation format combination.

Probabilities may be assigned to each of these constellation groups based on modulation format detector, spatial scheme detector, and/or communication history or they may be predefined for each modulation format and spatial scheme combination.

For example, if no probability is known a priori, predefined probabilities may be assigned to each of the constellations. For an unknown modulation format, for example, QPSK, 16-QAM, and 64-QAM may be assigned a predefined ⅓ probability each, or the probability may be assigned based on a determination from a modulation format detector and/or communication history. In the absence of a spatial scheme detector or prior communication knowledge, the probability may be split between group 1 (containing the SFBC and rank 1 constellation points) and group 2 (containing the LCDD and rank 2 constellation points), with 50% probability assigned to each. Each point within the constellation is also assigned a probability. The probability of the constellation may be evenly divided among the constellation points in the constellation. For example, if each group is given a probability of 50%, the four points of group 1 are given 12.5% probability each and the nine points of group 2 are given approximately 5.5% probability each. Probabilities may be reassigned as communication progresses.

As another example, the shared four SFBC and TM4 rank 1 points may be grouped into "group 1 points" and the shared nine LCDD and TM4 rank 2 points may be grouped into "group 2 points". A predefined probability may then be assigned as to whether a received signal falls in a particular group. For example, 70% chance in group 1 and 30% chance in group 2. In this scheme, because certain spatial schemes share potential constellation points, it is not necessary to further subdivide beyond the group level (such as per spatial scheme or per PMI for rank 1 precoding).

Alternatively, a probability weight can be assigned based at least in part on a determination from at least one of a spatial scheme detection and a modulation format detection. An example spatial scheme detector 1708 and modulation format detector 1704 are described in connection with FIG. 17. Rather than blindly assigning probabilities, a modulation format detector and/or spatial scheme detector may be implemented to detect soft decisions (i.e., probabilities of each modulation format and/or spatial scheme) and assign probabilities to each of the possible modulation format and/or spatial schemes accordingly.

The modulation format detector may rely on the fact that a constellation of symbols shares the same modulation format (e.g. symbols in a resource block may share the same modulation format) to determine the likelihood of each modulation format used for the group of symbols in the constellation, and based on the likelihood metrics, the modulation format detector may produce probabilities of each modulation format. Likewise, the spatial scheme detector may rely on the fact that a constellation of symbols shares the same spatial scheme (e.g. symbols in a resource block may share the same spatial scheme) to determine the likelihood of each spatial scheme used for the group of symbols in the constellation, and based on the likelihood metrics, the spatial scheme detector may produce probabilities of each spatial scheme.

As another alternative, or in combination with the above, probabilities assigned to each constellation may be based on prior communication history. Thus, when the signal is received from a cell or transmitter, the probability weight can be determined based at least in part on previous communication with the particular cell or transmitter. For example, if 70% of communications from a transmitter are QPSK, 20% are 16-QAM, and 10% are 64-QAM, probability weights may be set to 0.7 for QPSK, 0.2 for 16-QAM, and 0.1 for 64-QAM.

Potential modulation format and spatial scheme combinations include:

| Modulation format | Spatial Scheme |
|---|---|
| Group 1 | QPSK |
| Group 1 | 16-QAM |
| Group 1 | 64-QAM |
| Group 2 | QPSK/QPSK |

| Modulation format | Spatial Scheme |
| --- | --- |
| Group 2 | QPSK/16-QAM |
| Group 2 | QPSK/64-QAM |
| Group 2 | 16-QAM/QPSK |
| Group 2 | 16-QAM/16-QAM |
| Group 2 | 16-QAM/64-QAM |
| Group 2 | 64-QAM/QPSK |
| Group 2 | 64-QAM/16-QAM |
| Group 2 | 64-QAM/64-QAM | where Group 2 includes transmissions in a rank 2 spatial scheme where each transmit antenna transmits a mix of two symbols and the modulation format for the two symbols may be different. Thus, multiple modulation format combinations are listed above with regard to Group 2 combinations.

Figure 15:
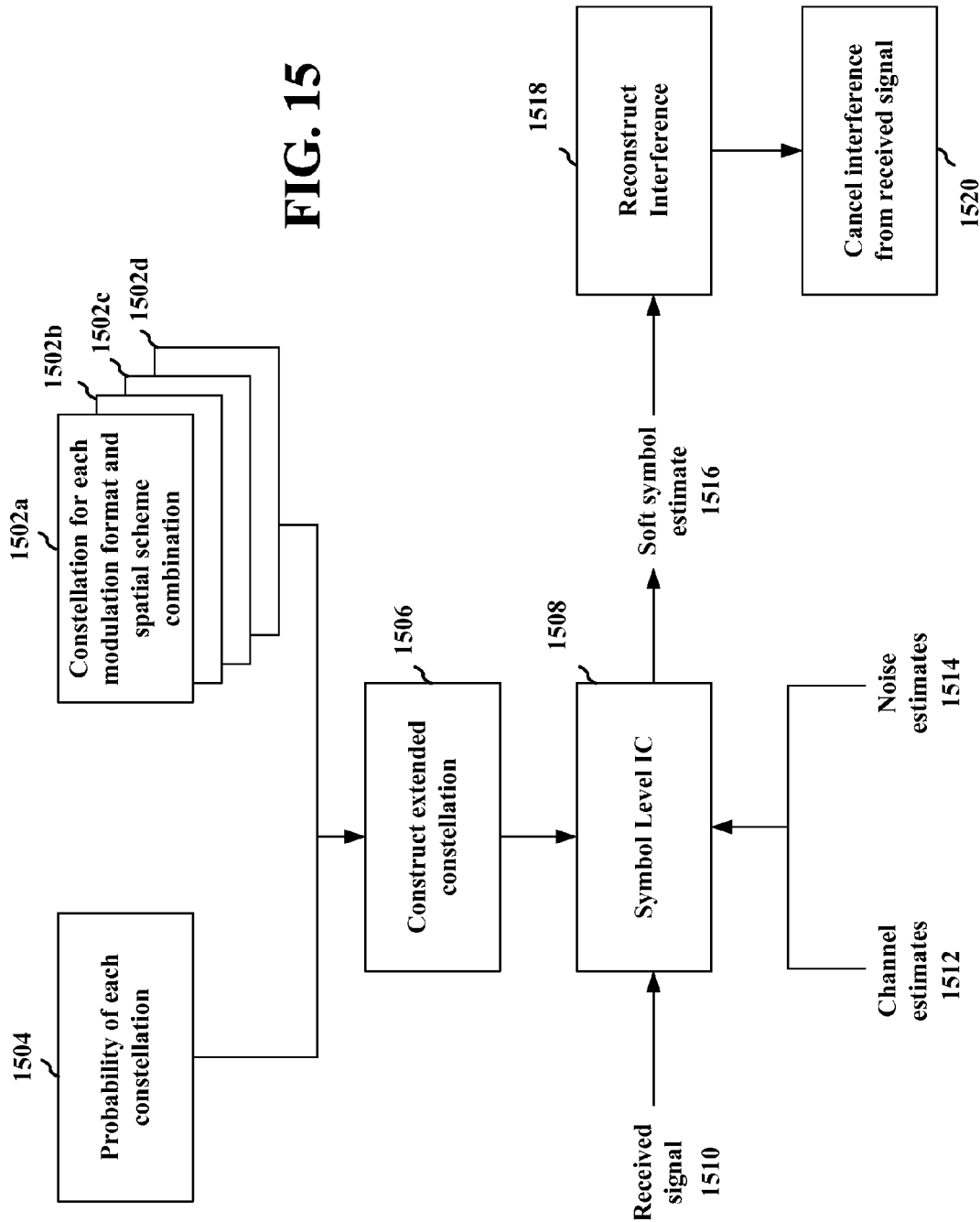
FIG. 15 is a block diagram illustrating an example method of symbol level interference cancellation without knowledge of a modulation format and/or spatial scheme.

In traditional symbol level interference cancellation, the UE knows the modulation format and spatial scheme and thus may pass on its knowledge of the constellation to the interference cancellation processing block. In the process described in connection with FIGS. 13 and 14, however, at least one or both of the modulation format and the spatial scheme may be unknown so an extended constellation can be created, e.g., for the UE to use for symbol level interference cancellation. FIG. 15 illustrates a flow diagram illustrating such symbol level interference cancellation. Constellations of each modulation format and spatial scheme combination can be determined, as shown in blocks 1502a through 1502d. Although FIG. 15 shows four constellations, any number of constellations can be constructed according to the number of potential modulation format and spatial scheme combinations. Each constellation includes a plurality points representing potential transmitted modulated symbols associated with a particular modulation format and spatial scheme combination.

A probability is assigned to each of the constellations, as illustrated in block 1504. An a priori or determined probability may be assigned. For example, the probabilities at 1504 may be determined via at least one of a spatial scheme detector, e.g., 1708, and a modulation format detector, e.g., 1704, or other module that determines probability based on prior communication history or predetermined probability.

In block 1506, an extended constellation can be constructed incorporating the constellations 1502a-d and the assigned probabilities for each constellation 1504. A symbol level interference cancellation block 1508 takes the extended constellation with the assigned probabilities and uses them, along with the received signal 1510, channel estimates 1512, and noise estimates 1514 to perform symbol level interference cancellation. Block 1508 forms and outputs a soft symbol estimate 1516. From that soft symbol estimate 1516, the received interference is reconstructed 1518 and then cancelled from the received signal to reduce interference 1520. Thus, using the probabilities for each of the constellation points, the UE attempts to determine the actual interfering signal that was broadcast, e.g., a PDSCH signal from a neighboring cell, so that it may cancel the interference from the received signal in order to reduce interference in the received signal.

1. Unknown Modulation Format

When a modulation format of a signal, e.g., is determined to be unknown or uncertain, a constellation of possible transmitted modulated symbols may be constructed corresponding to each of the possible modulation formats, and each constellation may be assigned a weight. For each modulation format, the constellation will include a plurality of plotted positions for the possible transmitted modulated symbol.

A probability is assigned to each of the possible modulation schemes. For example, if no probability is known a priori, predefined probabilities may be assigned to each of the modulation formats QPSK, 16-QAM, and 64-QAM (for example ⅓ probability each), or the probability may be assigned based on a determination from a modulation format detector and/or communication history.

An extended constellation of points from all possible modulation formats (e.g., including modulation orders QPSK, 16-QAM (quadrature amplitude modulation), and 64-QAM in LTE) may be constructed by combining the constellations for each of the possible modulation formats. Although these three modulation formats are listed, others are also considered to be within the scope of the present disclosure. The weight on each constellation point may be assigned according to the probability of the modulation format associated with that constellation point.

The extended constellation can be used to determine a soft symbol relating to a received symbol, e.g., a weighted average over all possible points of the extended constellation for the symbol. The soft symbol may relate, e.g., to a second set of symbols comprised within a received signal, the second set of symbols from a neighboring cell. The soft symbol can then be used to perform symbol level interference cancellation.

2. Unknown Spatial Scheme

A similar approach can be adopted for interference cancellation with an unknown or uncertain spatial scheme. In CRS-based PDSCH transmissions in Rel-8, 9, and 10 LTE/LTE-advanced, potential spatial schemes include SFBC, transmission mode 4 (TM4) rank 1 precoding with four different choices for precoding matrix indicator (PMI), TM4 rank 2 precoding with zero delay cyclic delay diversity (CDD), and rank 2 precoding with large cyclic delay diversity. A constellation of points can be constructed for each of the possible spatial schemes, and each constellation may be assigned a weight. Each constellation includes a plurality of constellation points corresponding to possible transmitted symbols. An extended constellation of points from all possible spatial schemes may be constructed by combining the constellations for all possible spatial schemes. The weight on each constellation point may be assigned according to the probability of the spatial scheme associated with that constellation point.

If no probability is known a priori, predefined probabilities may be assigned to each of the spatial scheme. For example, if nothing is known, a probability of ½ could be assigned for each of rank 1 and rank 2 spatial schemes.

Different probabilities may be assigned for each of the different rank 1 PMI options.

The extended constellation of points from all possible spatial schemes may be used to determine soft symbols corresponding to the possible spatial schemes. The soft symbol may relate, e.g., to a second set of symbols comprised within a received signal, the second set of symbols from a neighboring cell. The soft symbol can then be used to perform symbol level interference cancellation.

As described supra, FIG. 14C illustrates an example of an extended constellation of points when the spatial scheme is unknown or uncertain for a QPSK modulation format. For example, the modulation format may be known or may have been determined to be QPSK. Alternatively, the constellation in FIG. 14C may be one of a plurality of constellations corresponding to a spatial scheme and modulation format combination. The constellation in FIG. 14C may be further combined with constellations for possible spatial scheme and modulation format combinations other than QPSK when the modulation format is also unknown or uncertain.

If the probability of any particular modulation format and/or spatial scheme is very high (for example, a 99% likelihood of SFBC) the UE may proceed with the assumption that the high probability modulation format or spatial scheme is used and continue to perform interference cancellation with the detected modulation format or spatial scheme (i.e. without needing to construct extended constellation). If, however, certain priorities are within a specific range of each other, an extended constellation with unknown modulation format and/or spatial scheme can be constructed and used for interference cancellation.

Figure 16:
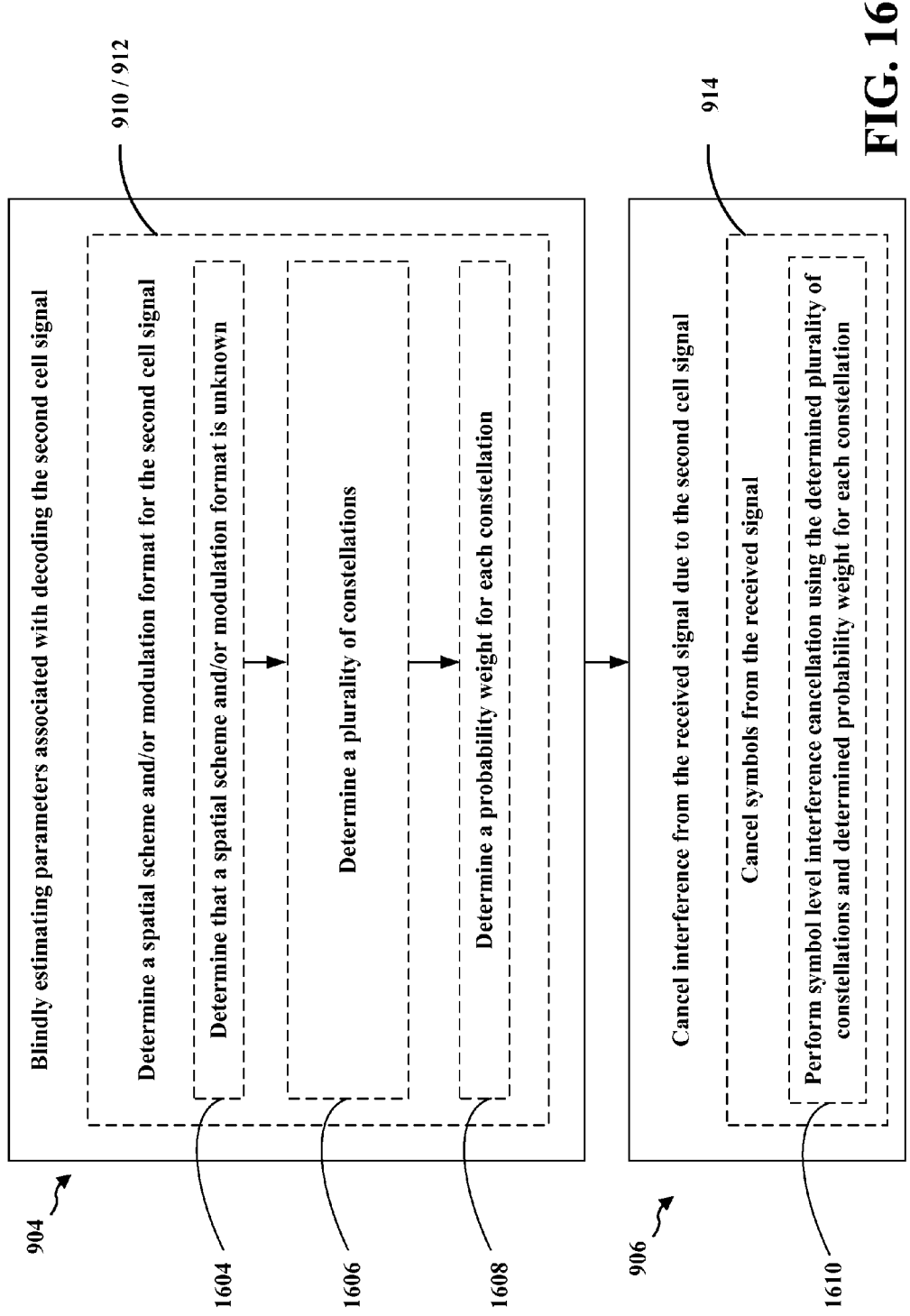
FIG. 16 is a flow chart of an example method of wireless communication.

The method of FIGS. 13 and 14 may be used in a number of applications for wireless communication. One possible application is interference cancellation. FIG. 16 illustrates an application of the process of FIG. 13 as an optional aspect of the blind estimation step 904 and interference cancellation step 906.

After the UE receives a signal at 902 (e.g., the combined signals 808/810), the UE blindly estimates parameters associated with decoding the second signal at 904. This may include a determination of at least one of a spatial scheme and a modulation format for the second signal, e.g., 910 and/or 912. As described in connection with FIG. 9, the estimation is made solely at the UE based on the received signal. The blind estimation of parameters may include a determination that at least one of a spatial scheme and a modulation format is unknown 1604 and a determination of a plurality of constellations. Each of the constellations comprise a plurality of possible transmitted symbols associated with a potential spatial scheme and modulation format combination 1606. A probability weight is determined for each of the plurality of constellations at 1608. Steps 1604, 1606, and 1608 can be made in the manner described in connection with steps 1304, 1306, and 1308 in FIG. 13.

At step 906, the UE cancels interference from the received signal that is due to the second signal. The interference cancellation is performed using the blindly estimated parameters. The interference cancellation may include canceling symbols from the received signal 914, such as symbols due to the second signal. As part of the cancellation, the UE may perform symbol level interference cancellation 1610 using the plurality of constellations and their corresponding probability weights determined in steps 1606 and 1608.

As previously noted, in order to perform PDSCH SLIC, a UE must know a transmission mode, spatial scheme, modulation format, RB allocation, and TPR for the signal. In order to perform PDSCH CWIC, the UE must additionally know the MCS and the redundancy version. Each of these parameters except TPR could be obtained by decoding the interfering PDCCH transmission associated with the interfering PDSCH. However, such a PDCCH decoding is challenging and can be computationally expensive. By blindly estimating certain parameters for the interfering signal as described herein, the UE is able to perform symbol level PDSCH IC in a more efficient manner.

Figure 17:
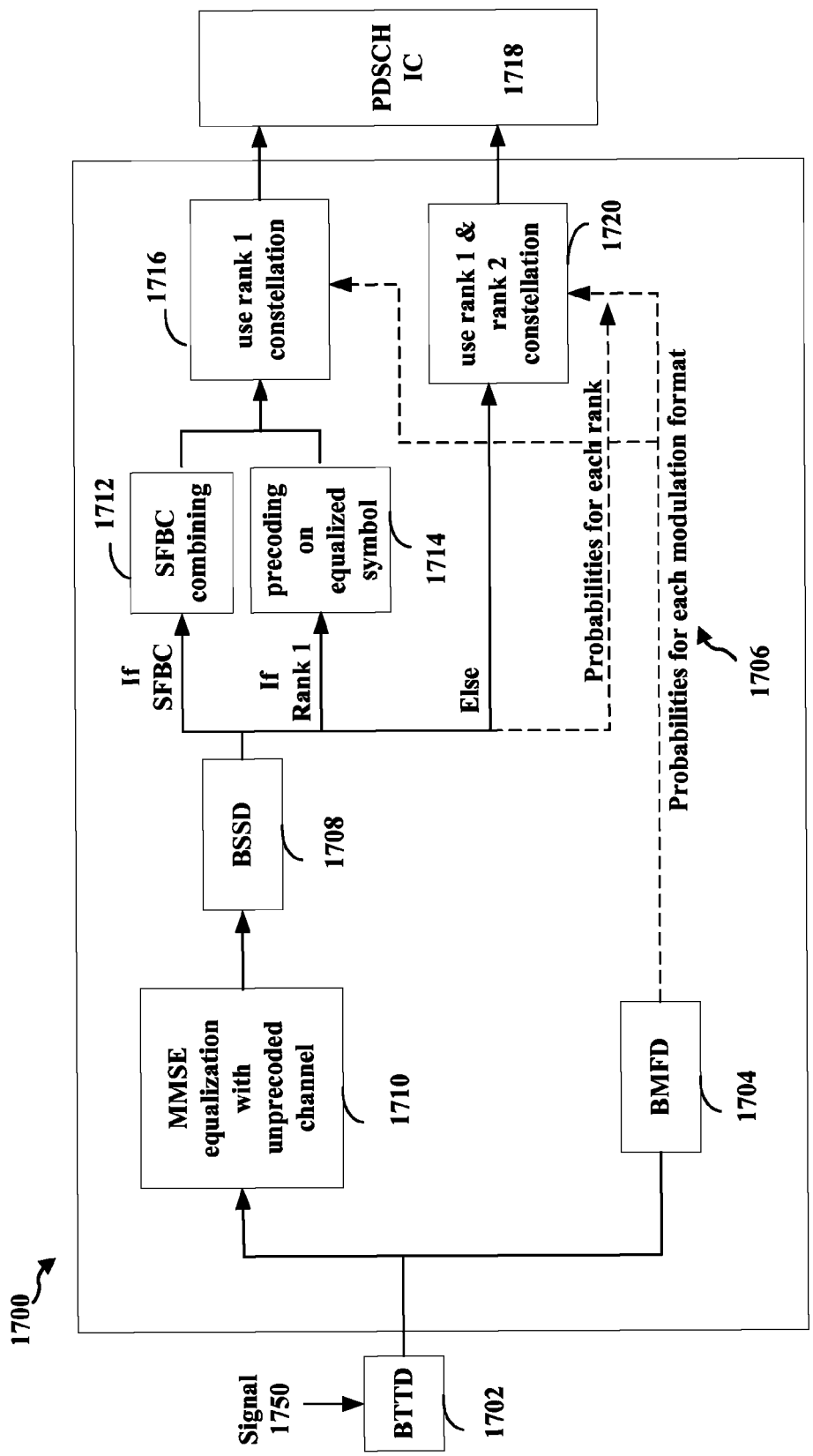
FIG. 17 is a conceptual flow diagram illustrating an example method of wireless communication.

FIG. 17 illustrates an example flow diagram for performing PDSCH IC 1700. FIG. 17 illustrates the order in which the actions may be taken rather than the actual structure of a potential device for performing such steps. A signal 1750 is received at a UE, such as UE 802, the signal having a first PDSCH signal from a serving cell and a second/interfering PDSCH signal from a neighboring cell. Although illustrated for PDSCH IC, the system/method is also applicable to blindly performing IC for any downlink shared channel or control channel.

A Blind Transmission Technique Detector (BTTD) 1702 may receive the signal and determine a transmission mode for the signal. This may include determining a transmission mode for the second, non-serving signal. The BTTD 1702 determines whether the interfering PDSCH transmission is based on CRS or UE-RS. Once this information is determined or estimated, the determination is applied to further perform an estimation of the spatial scheme and modulation format of the interfering transmission.

A Blind Modulation Format Detector (BMFD) 1704 may be used to determine the modulation format of the interfering transmission. This determination may be based on the determination of the BTTD 1702. However, the BMFD 1704 may blindly determine the modulation format separate from the determination of the BTTD 1702. Thus, the determination of the modulation format 1704 can be performed at any time prior to the construction of constellations, i.e., 1716 and 1720.

The BMFD 1704 may provide a probability 1706 for each of a plurality of possible modulation formats. These probabilities 1706 may then be used in constellation reconstruction, as described in connection with FIGS. 13-16. The constellation reconstruction can be based on the determination from the BMFD 1704 in connection with the determination made by a Blind Spatial Scheme Detector (BSSD) 1708.

If the BTTD 1702 determines that the interfering PDSCH transmission is a CRS based transmission, as part of the detection of the spatial scheme, a minimum mean squared error (MMSE) equalization 1710 can be performed to an unprecoded channel. The results of the MMSE equalization 1710 are then sent to the BSSD 1708.

Based on the determined spatial scheme by the BSSD 1708, the signal is further processed. In the proposed approach described herein, the BSSD 1708 is implemented to determine whether the given interfering PDSCH transmission uses SFBC, rank 1 transmission, or rank 2 transmission. Further, in the case of detecting a rank 1 transmission, the PMI is also determined. The signal is further processed based on the determined spatial scheme by the BSSD 1708. For example, if the BSSD 1708 determines with a high probability that the interfering signal is based on an SFBC spatial scheme, SFBC combining 1712 is performed for the interfering transmission.

If the BSSD 1708 determines with a high probability that the interfering signal is based on a rank 1 spatial scheme, then a determination will be made as to which PMI is used. Then, precoding on the equalized symbol 1714 is performed using the determined PMI. After the precoding, a rank 1 constellation reconstruction 1716 is performed. If the modulation format of the interfering signal is known, the constellation for the modulation format is used to perform PDSCH interference cancellation. If the modulation format is unknown, an extended constellation of the unknown modulation format (e.g., unknownMO) is used applying a probability of each MO that is provided by the BMFD 1704. This constellation reconstruction is then used to perform PDSCH IC 1718 on the received signal to cancel interference due to the interfering transmission from a neighboring cell.

However, for example, if neither SFBC nor rank 1 spatial schemes are estimated for the interfering signal with a high probability, then, after MMSE equalization 1710, a rank 1 and rank 2 constellation reconstruction 1720 can be applied. The constellations can be constructed as described in connection with FIGS. 13-16. The rank 1 and rank 2 constellation reconstruction 1720 may be applied either with the given modulation format, if known; or, if the modulation format is unknown, in combination with the probabilities given by the BMFD 1704. This may include using an extended constellation of either unknown spatial scheme for a given modulation format or unknown spatial scheme and unknown modulation format. This may include using an extended constellation for combinations of both an unknown modulation format and an unknown spatial scheme. The probabilities of each hypothesis or combination can be provided by the BMFD 1704 and BSSD 1708. The extended constellation 1720 can then be used to perform PDSCH IC 1718 on the received signal in order to cancel interference due to a PDSCH transmission from a neighboring, non-serving cell.

The determinations made by the BSSD 1708 and BMFD 1704 may be made in parallel as illustrated in FIG. 17. However, the determinations from one detector may also be made based on a prior determination by the other detector. For example, the BMFD 1704 determination may be made, at least in part, based on a prior determination by the BSSD 1708.

In the proposed approach described herein, the BSSD 1708 may be used to determine whether the given interfering PDSCH transmission uses SFBC, rank 1 transmission, or rank 2 transmission. Further, in the case of detecting a rank 1 transmission, the PMI that is being used is also determined. For SFBC, two out of four transmit symbols from the two transmit antennas over each of the two SFBC-encoded tones transmitted by the eNB depend on the same data symbol. Similarly, for a rank 1 transmission with a particular PMI, the two symbols transmitted from the two antennas of the eNB depend on the same data symbol. The disclosed approach utilizes these respective dependencies for both SFBC and rank 1 scenarios.

Figure 18:
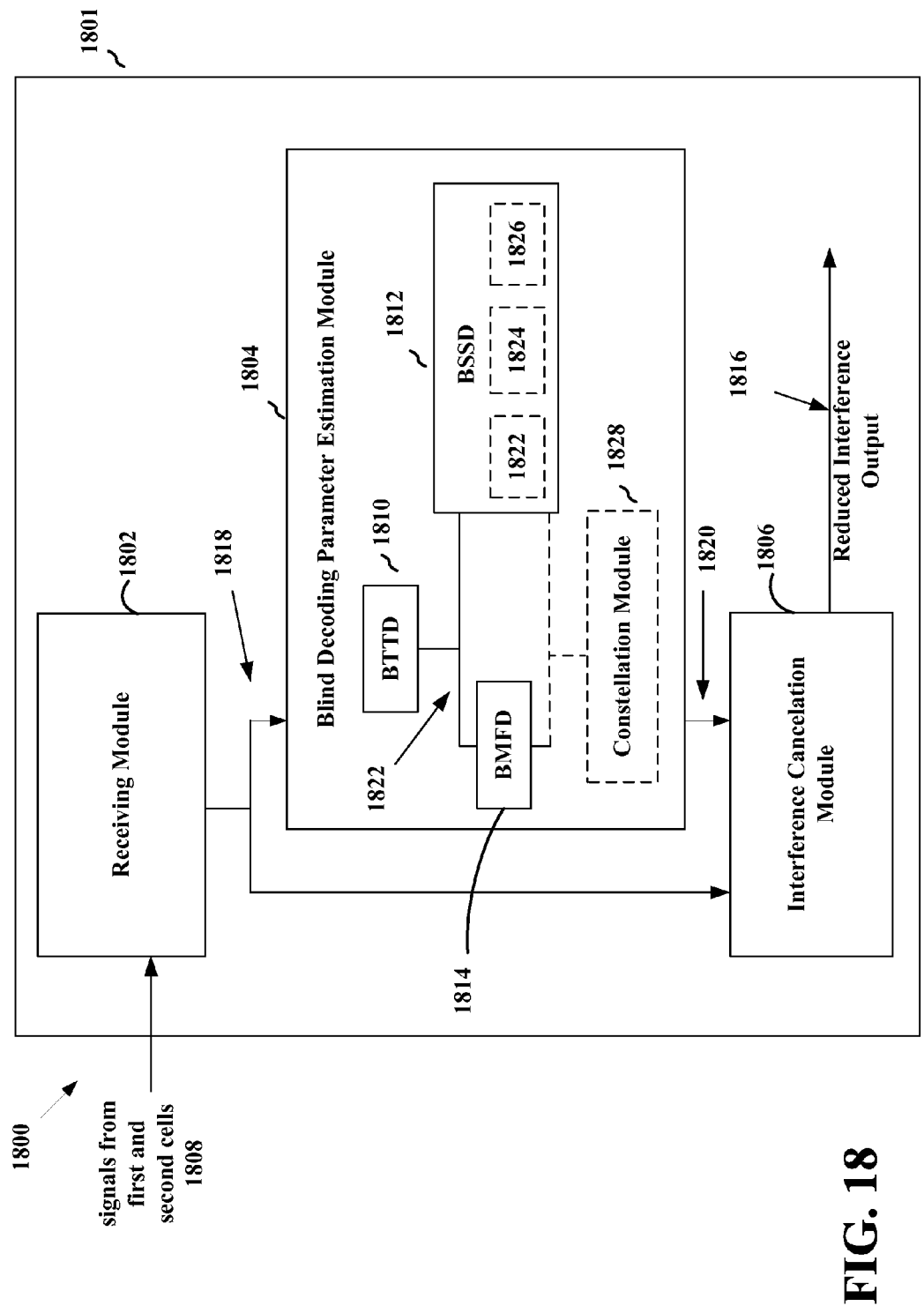
FIG. 18 is a conceptual data flow diagram illustrating an example data flow between different modules/means/components in an example apparatus.

FIG. 18 is a conceptual data flow diagram 1800 illustrating the data flow between different modules/means/components in an exemplary apparatus 1801. The apparatus 1801 includes a receiving module 1802 that is configured to receive signals 1808 (e.g. PDSCH or control channel) from a first cell and a second cell. For example, the first cell may be a serving cell for the apparatus and the second cell may be a non-serving cell for the apparatus 1801. The signal from the first cell may comprise a first set of symbols and the signal from the second cell may comprise a second set of symbols.

The apparatus further includes a blind decoding parameter estimation module 1804 connected to the output of the receiving module. The output 1818 of the receiving module may include an unprocessed signal including the signal from the first cell and the second cell. The blind decoding parameter estimation module is configured to blindly estimate parameters associated with decoding the second signal. The blind decoding parameter estimation module 1804 may further include any of a BTTD 1810 configured to blindly detect parameters associated with a transmission mode of the second signal, a BSSD 1812 configured to blindly detect parameters associated with a spatial scheme for the second signal, and a BMFD 1814 configured to blindly detect parameters associated with a modulation format for the second signal.

The BSSD 1812 may include a BSSD metric determination module 1822 configured to determine a metric based on the first set of symbols and the second set of symbols, a BSSD metric/threshold comparison module 1824 configured to compare the determined metric with a threshold, and a spatial scheme determination module configured to determine a spatial scheme associated with the at least one signal based on the comparison.

The blind decoding parameter estimation module 1804 may also include a constellation module 1828. The constellation module may be configured to determine that at least one of a spatial scheme and a modulation format of the second signal is unknown and thereafter to determine a plurality of constellations, each constellation comprising a plurality of possible transmitted modulated symbols associated with a potential spatial scheme and modulation format combination. A probability weight is determined for each constellation, and the determined plurality of constellations and the determined constellation probability weights can be used by interference cancellation module 1806 to cancel the symbols due to the second signal. The constellation module may assign probabilities to the constellation based on a determination from at least one of BMFD 1814 and BSSD 1812.

The apparatus further includes an interference cancellation module 1806 that receives an output 1820 of the blind decoding parameter estimation module 1804 and receives an unprocessed signal output from the receiving module. The interference cancellation module 1806 is configured to cancel interference from the received signal due to the second signal, the interference cancellation being based on the blindly estimated parameters. The interference cancellation module 1806 may cancel symbols from the received signal, the cancelled symbols being symbols from the second signal. The interference cancellation module outputs a processed signal 1816 based on the received signal 1808 having the cancellation of the symbols from the second signal.

The BTTD 1810 may blindly determine whether the second signal is based on CRS or UE-RS, which determination may be made, at least in part, based on whether the second signal is resource block (RB) based or slot based.

The BSSD 1812 may receive an output 1822 from the BTTD having information regarding the determined transmission technique. Based, at least in part, on the determination by the BTTD, the BSSD 1812 may blindly determine whether the second signal uses a transmit diversity transmission (e.g. SFBC), a rank 1 transmission, or a rank 2 transmission. The BSSD may determine a plurality of probabilities corresponding to likelihoods that the second signal is a space frequency block coding (SFBC) transmission, a rank 1 transmission, and a rank 2 transmission. Such probabilities can be used by constellation module 1828 to assign a corresponding probability to a constellation for a modulation format and spatial scheme combination. When the BSSD determines that the second signal is a rank 1 transmission, the BSSD may further determine which precoding matrix indicator (PMI) is used for the second signal.

The BMFD 1814 may receive an output 1822 from the BTTD having information regarding the determined transmission technique. The BMFD may also blindly determine the modulation format separate from the determination made by the BTTD. Based, at least in part, on the determination by the BTTD, the BMFD 1814 may blindly determine whether the modulation format is one of QPSK, QAM (e.g. 16-QAM, 64-QAM, 256-QAM), and M-PSK (e.g. M=3). Similar to the BSSD, the BMFD may determine a plurality of probabilities corresponding to likelihoods that the second signal has a particular modulation format. These probabilities may also be used by constellation module 1828 to assign a corresponding probability to a constellation for a modulation format and spatial scheme combination.

Parameters based on the determinations of the BTTD, BSSD, BMFD, and/or constellation module are output to the interference cancellation module 1806. The interference cancellation module uses the parameters output by the blind decoding parameter estimation module 1804 to cancel interference due to the second signal from the received signal. The processed signal having the interference cancelled is then output from the interference cancellation module.

The determination of the transmission technique of the second signal may be made prior to the determination of the spatial scheme and the modulation format of the second signal, and the determination of the spatial scheme and the modulation format of the second signal can be made based, at least in part, on the determination of the transmission technique of the second signal.

The determination of the spatial scheme of the second signal and the determination of the modulation format of the second signal can be performed in parallel or the determination of one may be performed after the other.

The BTTD 1810 may provide weighted probabilities associated with a plurality of transmission techniques (e.g. CRS, UE-RS), and the interference cancellation module 1806 may cancel interference due to the second signal from the received signal based the weighted probabilities associated with the plurality of transmission techniques.

The apparatus may include additional modules that perform each of the steps of the algorithm in the aforementioned flow charts FIGS. 9-13 and 15-17. As such, each step in the aforementioned flow charts FIGS. 9-13 and 15-17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 19:
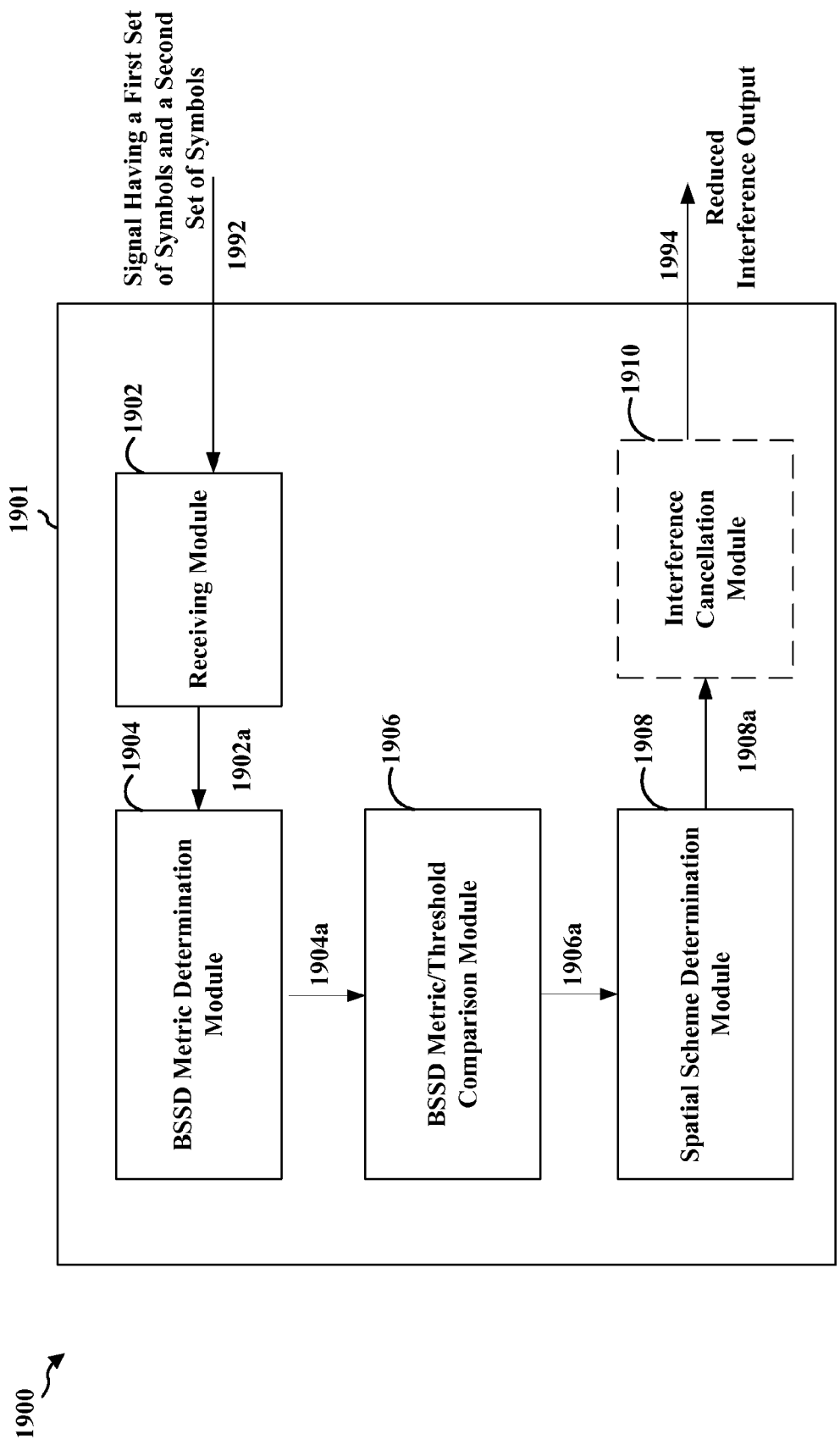
FIG. 19 is a conceptual data flow diagram illustrating the data flow between different modules/means/components in an example apparatus.

FIG. 19 is a conceptual data flow diagram 1900 illustrating the data flow between different modules/means/components in an exemplary apparatus 1901. The apparatus 1901 includes a module 1904 that provides a signal with a determination of a BSSD metric 1904a based on first and second sets of symbols received from a module 1902 that receives at least one signal 1992, which may be unprocessed, having the first and second sets of symbols. The module 1904 provides the BSSD metric 1904a to a module 1906 that compares the metric with a threshold to generate a set of results 1906a. The set of results 1906a may include a distance or correlation determination, as discussed above. The set of results 1906a is then communicated to a module 1908 coupled to the module 1906 that determines a spatial scheme associated with the at least one signal based on the comparison. The determination may include a plurality of probabilities that corresponding to possibilities that a spatial scheme is being used. A module 1910 that performs interference cancellation based on the determined spatial scheme receives the determination of the spatial scheme from the module 1908. A reduced interference output 1994 is then output from the module 1910. In one aspect of the interference cancellation approach disclosed herein, the interference cancellation module 1910 may be included in a separate portion outside of the apparatus 1901 and thus the output from the apparatus 1901 would be a spatial scheme determination. As discussed supra, the spatial scheme determination may include one or more probabilities of the spatial scheme determination.

The apparatus may include additional modules that perform each of the steps of the algorithm in the aforementioned flow charts in FIGS. 12 and 13. As such, each step in the aforementioned flow charts in FIGS. 12 and 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 20:
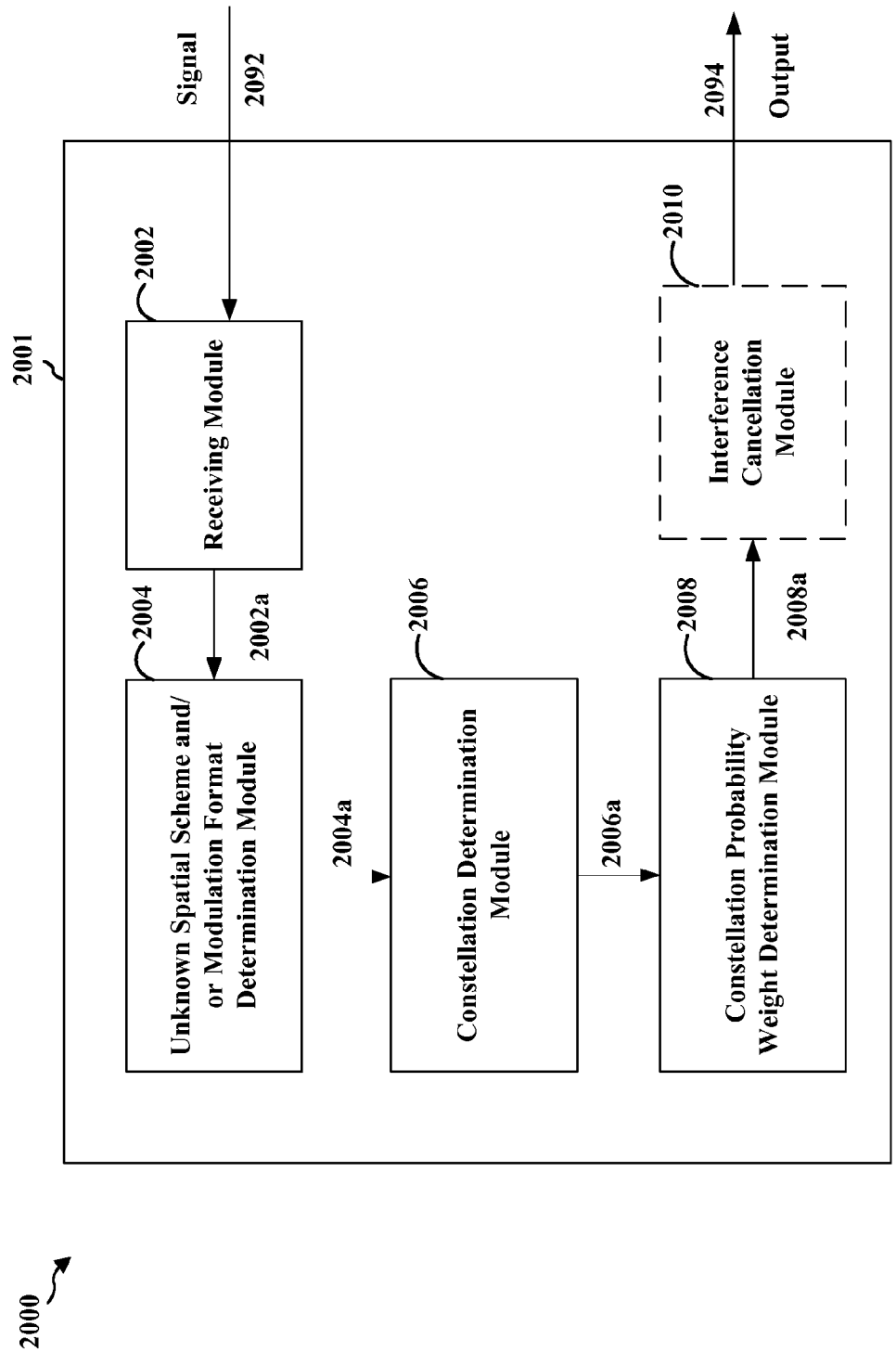
FIG. 20 is a conceptual data flow diagram illustrating the data flow between different modules/means/components in an example apparatus.

FIG. 20 is a conceptual data flow diagram 2000 illustrating the data flow between different modules/means/components in an exemplary apparatus 2001. The apparatus 2001 includes a module 2002 that receives a signal 2092. The signal may comprise, e.g., a first signal and a second signal. The receiving module 2002 provides a signal to an unknown spatial scheme and/or modulation determination module 2004, which determines that at least one of a spatial scheme and a modulation format is unknown and indicates such in a signal 2004 provided to a constellation determination module 2006. The constellation determination module determines a plurality of constellations, each constellation comprising a plurality of possible transmitted modulated symbols associated with a potential spatial scheme and modulation format combination. Any number of constellations may be determined based on the number of potential combinations of unknown modulation formats and spatial schemes. Each constellation includes a plurality of points corresponding to potential transmitted symbols. The determined constellations 2006a are provided to a constellation probability weight determination module that determines a probability weight for each constellation. An extended constellation can be created by combining each of the determined constellations and their corresponding probability weight.

The determined constellations and their corresponding probability weight 2008a are then used to determine at least one of a spatial scheme and modulation format using the determined plurality of constellations and the determined probability weight for each constellation. For example, an interference cancellation module 2010 performs symbol level interference cancellation based on the determined constellations and their corresponding probability weight 2008a, thereby cancelling the symbols from the second signal from the combined signal. The signal 2094 having reduced interference is then output.

The apparatus may include additional modules that perform each of the steps of the algorithm in the aforementioned flow charts in FIGS. 13, 15, and 16. As such, each step in the aforementioned flow charts in FIGS. 13, 15, and 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 21:
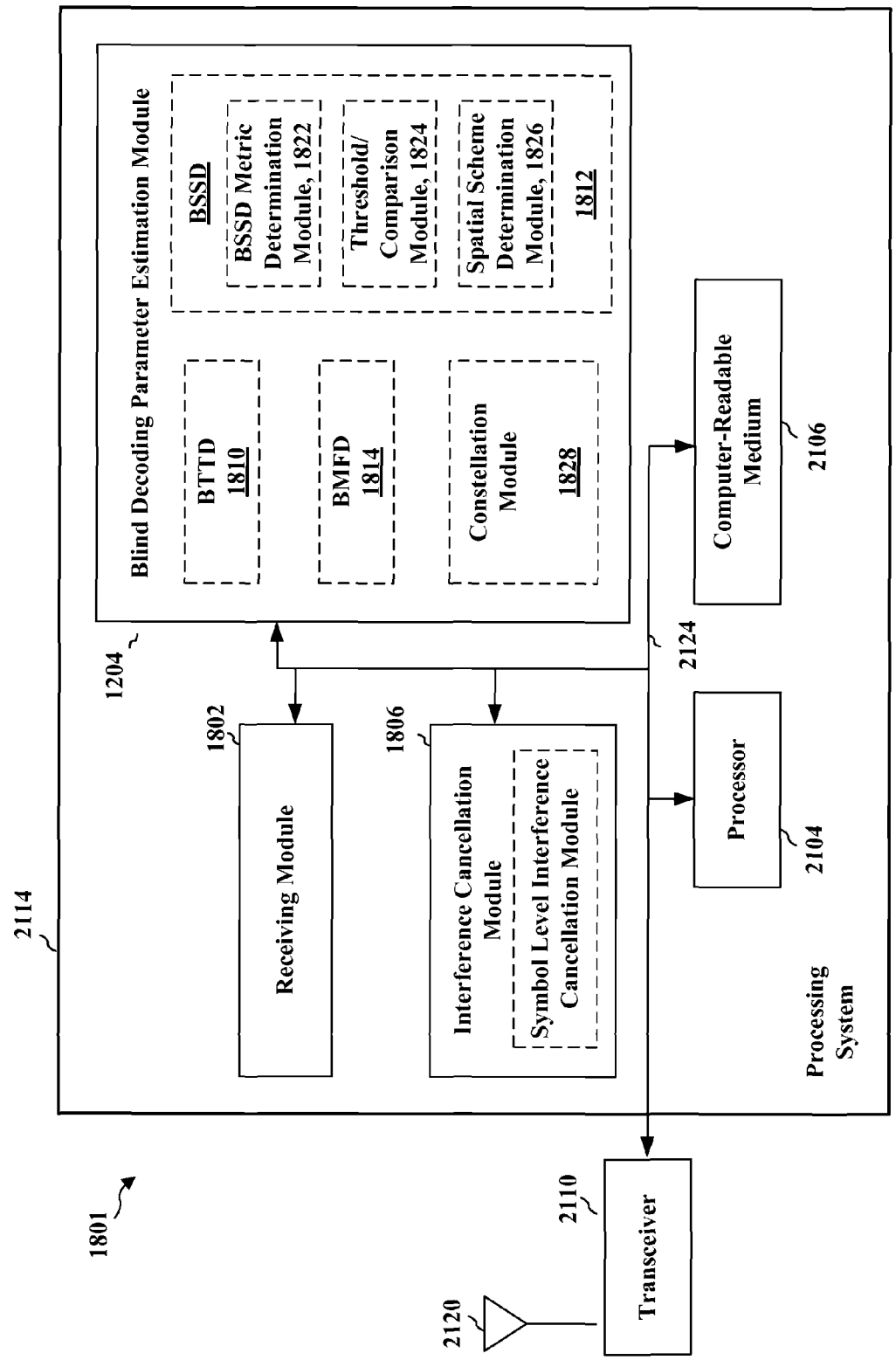
FIG. 21 is a diagram illustrating an example of a hardware implementation for an apparatus employing a processing system.

FIG. 21 is a diagram illustrating an example of a hardware implementation for an apparatus 1801 employing a processing system 2114. Potential subcomponents are illustrated having a dashed line as opposed to a solid line. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware modules, represented by the processor 2104, the modules 1802, 1804, 1806, 1810, 1812, 1814, 1822, 1824, 1826, and 1828 and the computer-readable medium 2106. The bus 2124 may also link various other circuits such as timing sources, peripherals, voltage regulators, and power management circuits, which are well known in the art, and therefore, will not be described any further.

The apparatus includes a processing system 2114 coupled to a transceiver 2110. The transceiver 2110 is coupled to one or more antennas 2120. The transceiver 2110 provides a means for communicating with various other apparatus over a transmission medium. The processing system 2114 includes a processor 2104 coupled to a computer-readable medium 2106. The processor 2104 is responsible for general processing, including the execution of software stored on the computer-readable medium 2106. The software, when executed by the processor 2104, causes the processing system 2114 to perform the various functions described supra for any particular apparatus. The computer-readable medium 2106 may also be used for storing data that is manipulated by the processor 2104 when executing software. The processing system further includes modules 1802, 1804, 1806, 1810, 1812, 1814, 1822, 1824, 1826, and 1828. The modules may be software modules running in the processor 2104, resident/stored in the computer readable medium 2106, one or more hardware modules coupled to the processor 2104, or some combination thereof. The processing system 2114 may be a component of the UE 650 and may include the memory 660 and/or at least one of the TX processor 668, the RX processor 656, and the controller/processor 659.

Figure 22:
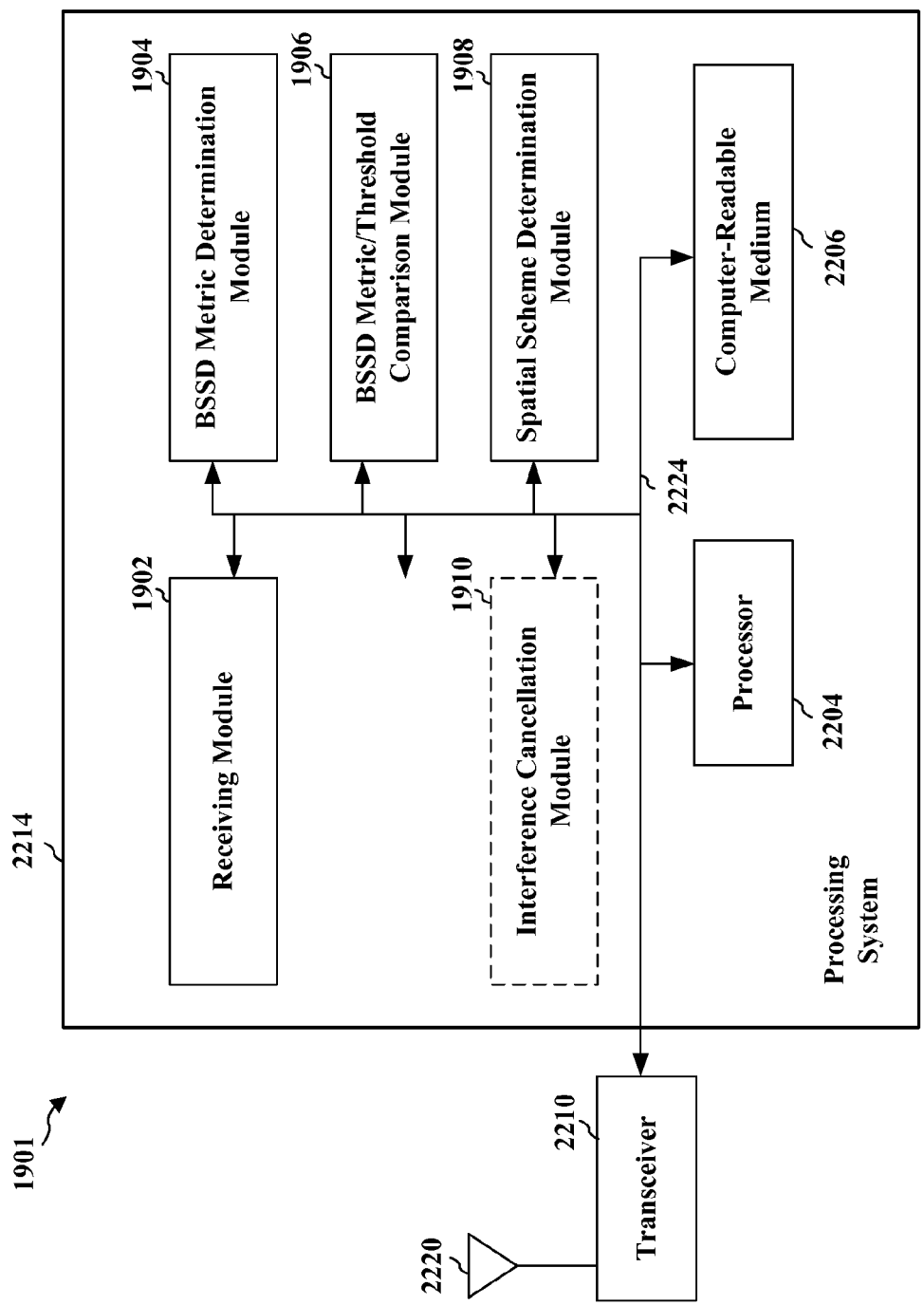
FIG. 22 is a diagram illustrating an example of a hardware implementation for an apparatus employing a processing system.

FIG. 22 is a diagram illustrating an example of a hardware implementation for an apparatus 1901 employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware modules, represented by the processor 2204, the modules 1902, 1904, 1906, 1908, and 1910, and the computer-readable medium 2206. The bus 2224 may also link various other circuits such as timing sources, peripherals, voltage regulators, and power management circuits, which are well known in the art, and therefore, will not be described any further.

The apparatus includes a processing system 2214 coupled to a transceiver 2210. The transceiver 2210 is coupled to one or more antennas 2220. The transceiver 2210 provides a means for communicating with various other apparatus over a transmission medium. The processing system 2214 includes a processor 2204 coupled to a computer-readable medium 2206. The processor 2204 is responsible for general processing, including the execution of software stored on the computer-readable medium 2206. The software, when executed by the processor 2204, causes the processing system 2214 to perform the various functions described supra for any particular apparatus. The computer-readable medium 2206 may also be used for storing data that is manipulated by the processor 2204 when executing software. The processing system further includes modules 1902, 1904, 1906, 1908, and 1910. The modules may be software modules running in the processor 2204, resident/stored in the computer readable medium 2206, one or more hardware modules coupled to the processor 2204, or some combination thereof. The processing system 2214 may be a component of the UE 650 and may include the memory 660 and/or at least one of the TX processor 668, the RX processor 656, and the controller/processor 659.

Figure 23:
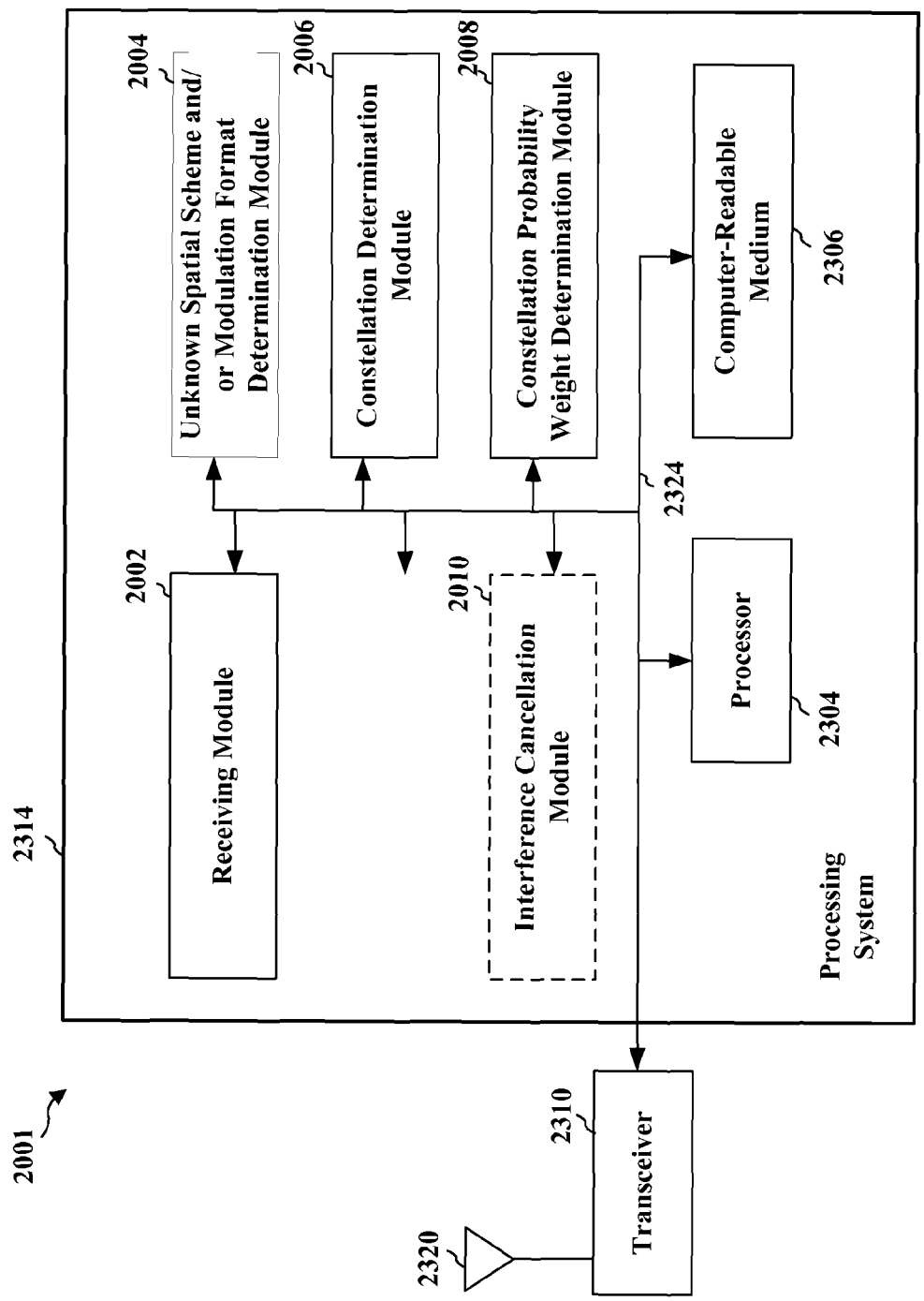
FIG. 23 is a diagram illustrating an example of a hardware implementation for an apparatus employing a processing system.

FIG. 23 is a diagram illustrating an example of a hardware implementation for an apparatus 2001 employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware modules, represented by the processor 2304, the modules 2002, 2004, 2006, 2008, and 2010, and the computer-readable medium 2306. The bus 2324 may also link various other circuits such as timing sources, peripherals, voltage regulators, and power management circuits, which are well known in the art, and therefore, will not be described any further.

The apparatus includes a processing system 2314 coupled to a transceiver 2310. The transceiver 2310 is coupled to one or more antennas 2320. The transceiver 2310 provides a means for communicating with various other apparatus over a transmission medium. The processing system 2314 includes a processor 2304 coupled to a computer-readable medium 2306. The processor 2304 is responsible for general processing, including the execution of software stored on the computer-readable medium 2306. The software, when executed by the processor 2304, causes the processing system 2314 to perform the various functions described supra for any particular apparatus. The computer-readable medium 2306 may also be used for storing data that is manipulated by the processor 2304 when executing software. The processing system further includes modules 2002, 2004, 2006, 2008, and 2010. The modules may be software modules running in the processor 2304, resident/stored in the computer readable medium 2306, one or more hardware modules coupled to the processor 2304, or some combination thereof. The processing system 2314 may be a component of the UE 650 and may include the memory 660 and/or at least one of the TX processor 668, the RX processor 656, and the controller/processor 659.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE), comprising:
   receiving a signal, the received signal comprising at least a first signal and a second signal, the first signal and the second signal originating from a same cell;
   blindly estimating parameters associated with decoding the second signal, the blind estimation including blindly determining a transmission technique of the second cell signal based at least in part on blindly determining whether the second signal is based on a cell specific reference signal (CRS) and whether the second signal is based on a UE specific reference signal (UE-RS); and
   processing the received signal based on the blindly estimated parameters.

2. The method of claim 1, wherein processing the received signal comprises cancelling interference from the received signal due to the second signal, the interference cancellation being based on the blindly estimated parameters.

3. The method of claim 1, wherein:
   the received signal comprises at least one of a downlink shared channel and a control channel from the same cell; and
   processing the received signal comprises cancelling symbols from the received signal, the cancelled symbols being symbols from the second signal.

4. The method of claim 3, wherein the first signal and the second signal originate from a serving cell.

5. The method of claim 1, wherein blindly estimating parameters associated with the second signal further comprises,
   determining a spatial scheme for the second signal.

6. The method of claim 5, wherein blindly estimating parameters associated with the second signal further comprises,
   determining a modulation format of the second signal.

7. The method of claim 6, wherein the determination of the transmission technique of the second signal is made prior to the determination of the spatial scheme and the modulation format of the second signal, and
   wherein the determination of the spatial scheme and the modulation format of the second signal are made based, at least in part, on the determination of the transmission technique of the second signal.

8. The method of claim 6, wherein determining the modulation format for the second signal comprises,
   determining a plurality of probabilities corresponding to probabilities that the modulation format of the second signal is each one of the allowed modulation formats, where the allowed modulation formats may include binary phase shift keying (BPSK), quadrature phase shift keying (QPSK), quadrature amplitude modulation (QAM) of different modulation orders, and phase-shift keying (PSK) of different modulation orders.

9. The method of claim 6, wherein determining the modulation format of the second signal comprises,
   determining whether the modulation format is one of quadrature phase shift keying (QPSK), quadrature amplitude modulation (QAM) of a certain modulation order, and phase-shift keying (PSK) of a certain modulation order.

10. The method of claim 9, wherein the determination of the transmission technique provides weighted probabilities associated with a plurality of transmission techniques, and the method further comprises,
    cancelling interference due to the second signal from the received signal based on the weighted probabilities associated with the plurality of transmission techniques.

11. The method of claim 1, wherein the signal comprises a first set of symbols and a second set of symbols, and wherein blindly estimating parameters associated with decoding the second signal further comprises,
    determining a metric based on the first set of symbols and the second set of symbols;
    comparing the metric with a threshold; and
    determining the spatial scheme associated with the second signal based on the comparison.

12. The method of claim 1, wherein blindly estimating parameters associated with decoding the second signal further comprises,
    determining that at least one of a spatial scheme and a modulation format is unknown;
    determining a plurality of constellations, each constellation comprising a plurality of possible transmitted modulated symbols associated with a potential spatial scheme and modulation format combination; and
    determining a probability weight for each constellation,
    wherein processing the received signal comprises cancelling interference from the received signal due to the second signal by performing symbol level interference cancellation using the determined plurality of constellations and the determined constellation probability weights.

13. The method of claim 1, wherein blindly estimating parameters associated with decoding the second signal further includes detecting parameters associated with at least one of a modulation format, a spatial scheme, resource allocation information, and a traffic to pilot ratio of the second signal.

14. An apparatus for wireless communication, comprising:
    means for receiving a signal, the received signal comprising at least a first signal and a second signal, the first signal and the second signal originating from a same cell;
    means for blindly estimating parameters associated with decoding the second signal, wherein blindly estimating the parameters comprises blindly determining a transmission technique of the second cell signal based at least in part on blindly determining whether the second signal is based on a cell specific reference signal (CRS) and whether the second signal is based on a UE specific reference signal (UE-RS); and
    means for processing the received signal based on the blindly estimated parameters.

15. The apparatus of claim 14, wherein the means for processing is configured to cancel interference from the received signal due to the second signal, the interference cancellation being based on the blindly estimated parameters.

16. The apparatus of claim 14, wherein the means for blindly estimating parameters comprises,
    means for detecting parameters associated with at least one of a transmission mode, a modulation format, a spatial scheme, resource allocation information, and a traffic to pilot ratio of the second signal.

17. The apparatus of claim 16, wherein the first signal and the second signal originate from a serving cell,
wherein the received signal comprises at least one of a downlink shared channel and a control channel from the serving cell, and
wherein the means for processing cancels symbols from the received signal due to the second signal.

18. The apparatus of claim 14, wherein the means for blindly estimating parameters associated with the second signal determines a spatial scheme for the second signal.

19. The apparatus of claim 18, wherein determining the spatial scheme for the second signal includes determining whether the second signal uses a transmit diversity transmission, a rank 1 transmission, or a rank 2 transmission, and
wherein determining the spatial scheme for the second signal includes determining which precoding matrix indicator (PMI) is used for the second signal, when it is determined that the second signal uses a rank 1 transmission.

20. The apparatus of claim 18, wherein the determining the spatial scheme for the second signal determines a plurality of probabilities corresponding to likelihoods that the second signal is a space frequency block coding (SFBC) transmission, a rank 1 transmission, and a rank 2 transmission.

21. The apparatus of claim 18, wherein the means for blindly estimating parameters associated with the second signal determines a modulation format of the second signal.

22. The apparatus of claim 21, wherein the determination of the transmission technique provides weighted probabilities associated with a plurality of transmission techniques, and wherein the means for processing cancels interference due to the second signal from the received signal based on the weighted probabilities associated with the plurality of transmission techniques.

23. The apparatus of claim 14, wherein the signal comprises a first set of symbols and a second set of symbols, and wherein the means for blindly estimating parameters associated with decoding the second signal,
determines a metric based on the first set of symbols and the second set of symbols;
compares the metric with a threshold; and
determines the spatial scheme associated with the second signal based on the comparison.

24. The apparatus of claim 14, wherein the means for blindly estimating parameters associated with decoding the second signal,
determines that at least one of a spatial scheme and a modulation format is unknown;
determines a plurality of constellations, each constellation comprising a plurality of possible transmitted modulated symbols associated with a potential spatial scheme and modulation format combination; and
determines a probability weight for each constellation, and
wherein the means for processing cancels interference from the received signal due to the second signal by performing symbol level interference cancellation using the determined plurality of constellations and the determined constellation probability weights.

25. A non-transitory computer-readable medium storing computer executable code for:
receiving a signal, the received signal comprising at least a first signal and a second signal, the first signal and the second signal originating from a same cell;
blindly estimating parameters associated with decoding the second signal, wherein blindly estimating the parameters comprises blindly determining a transmission technique of the second signal based at least in part on determining whether the second signal is based on blindly determining whether the second signal is based on a cell specific reference signal (CRS) and whether the second signal is based on a UE specific reference signal (UE-RS); and
processing the received signal based on the blindly estimated parameters.

26. The computer-readable medium of claim 25, the code for processing the received signal being configured to cancel interference from the received signal due to the second signal, the interference cancellation being based on the blindly estimated parameters.

27. An apparatus for wireless communication, comprising:
a memory; and
at least one processor coupled to the memory and configured to:
receive a signal, the received signal comprising at least a first signal and a second signal, the first signal and the second signal originating from a same cell;
blindly estimate parameters associated with decoding the second signal, wherein blindly estimating the parameters comprises blindly determining a transmission technique of the second signal based at least in part on determining whether the second signal is based on blindly determining whether the second signal is based on a cell specific reference signal (CRS) and whether the second signal is based on a UE specific reference signal (UE-RS); and
process the received signal based on the blindly estimated parameters.

28. The apparatus of claim 27, wherein the at least one processor configured to process the received signal is configured to cancel interference from the received signal due to the second signal, the interference cancellation being based on the blindly estimated parameters.

* * * * *